United States Patent
Carey et al.

(12) 
(10) Patent No.: US 6,526,412 B1
(45) Date of Patent: Feb. 25, 2003

(54) USE OF ADAPTER KEY TO INCREASE PERFORMANCE WHEN UPDATING A VALUE REFERENCED BY A DATA ACCESS OBJECT

(75) Inventors: James Edward Carey, Rochester, MN (US); Philip James Sanders, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/296,988

(22) Filed: Apr. 22, 1999

(51) Int. Cl.[7] .............................................. G06F 17/30

(52) U.S. Cl. .......................................... 707/103; 707/2

(58) Field of Search ........................... 707/2, 102, 100, 707/3–4, 103; 709/311, 315–316, 317; 717/140, 151, 153

(56) References Cited

U.S. PATENT DOCUMENTS

| | | | | | |
|---|---|---|---|---|---|
| 5,768,510 A | * | 6/1998 | Gish | ........................... | 709/202 |
| 5,787,453 A | * | 7/1998 | Kennedy | ........................ | 707/4 |
| 5,878,411 A | * | 3/1999 | Burroughs et al. | .......... | 707/102 |
| 5,913,061 A | * | 6/1999 | Gupta et al. | ................. | 709/101 |
| 5,977,967 A | * | 11/1999 | Berner et al. | ................ | 345/765 |
| 5,991,823 A | * | 11/1999 | Cavanaugh et al. | ......... | 709/330 |
| 6,092,075 A | * | 7/2000 | Carey et al. | ................. | 707/102 |

FOREIGN PATENT DOCUMENTS

WO    WO 99/17232    *   4/1999           17/30

OTHER PUBLICATIONS

"Business Process components for Distributed Objects Applications," Bohrer et al., Communicaitons of the ACM, vol. 4, No. 6,. Jun., 1998, pp. 43–48.*
"Database Usage in Telecommunications through CORBA," Raatikainen et al., Proceedings of the 7th IEE Intelligent Network Workshop, May 1998, pp. 291–301.*

* cited by examiner

Primary Examiner—Hosain T. Alam
(74) Attorney, Agent, or Firm—Schmeiser, Olsen & Watts

(57) ABSTRACT

A method and apparatus for dynamically loading criteria from an object to reduce the amount of total criteria necessary to update a referenced value is disclosed. The value can be "inside" a database or an object in an object-oriented framework. When updating a value that is referenced by a data access object (such as an access key) that depends on other objects (such as access keyables) for criteria necessary to reference the value, a special data access object (called an adapter access key) is used instead of using the data access object. Instead of creating and populating all of the access keyables prior to an update of the value, the adapter access key holds onto the source of the criteria (such as a business object) needed to fill the access keyables and to access the value. The adapter access key dynamically determines criteria from the business object only for those keyables that are important in updating the value. This reduces the comparison time that used to occur when the criteria in the access key was compared to criteria that determined if the value was "within" a database or an object in an object-oriented framework, or if the data access object pointed to the value. Preferably, there is a facsimile (such as with a boolean array) of keyables that is marked in such a way that the adapter access key can be easily reset and used for multiple updates. This eliminates copying of the original key and minimizes comparison time.

29 Claims, 11 Drawing Sheets

600

| ORDER NUMBER | CUSTOMER | ORDER STATUS | DELIVERY TYPE |
|---|---|---|---|
| NVN | ALPHA | ON HOLD | NORMAL |

610

INCLUDES 650

FALSE 660

| ORDER NUMBER | CUSTOMER | ORDER STATUS | DELIVERY TYPE |
|---|---|---|---|
| IGNORED | ALL | ACCEPTED SHIPPED | IGNORED |

640

INCLUDES 670

TRUE 680

| ORDER NUMBER | CUSTOMER | ORDER STATUS | DELIVERY TYPE |
|---|---|---|---|
| NVN | ALPHA | ACCEPTED | NVN |

630

USE OF ADAPTER KEY TO INCREASE PERFORMANCE WHEN UPDATING A VALUE REFERENCED BY A DATA ACCESS OBJECT

RELATED APPLICATION

This application is related to the following U.S. patent applications, each of which is incorporated herein by reference:

"FRAMEWORK FOR BUSINESS APPLICATION USING CACHED AGGREGATE AND SPECIFICATION KEY", Ser. No. 09/038349, filed Mar. 11, 1998 by Carey et al. now U.S. Pat. No. 6,092,075, and "ACCESS KEY OBJECTS", Ser. No. 09/007492, filed Jan. 15, 1998, by Carey et al.

BACKGROUND OF THE INVENTION

1. Technical Field

This invention generally relates to data accessing objects that use criteria to reference a value or element, such as in object-oriented software frameworks or databases. More specifically, this invention relates to an adapter key that references a value and that dynamically loads criteria from another object to reduce the amount of total criteria necessary to access and update the referenced value.

2. Background Art

Creating software is a very time consuming process. Planning the organization of the software components, planning the functionality of each component, coding all components, and then debugging each component and the interactions between components can be an extremely long process.

Because of the struggle with software, many enterprises buy "off-the-shelf" software instead of creating their own. For these enterprises, this is this is an admirable solution to the problems associated with creating software because someone else (the software vendor) actually creates, debugs, and updates the software. The enterprise merely uses the software. However, sometimes off-the-shelf software does not provide all of the functionality that an enterprise needs.

Today, enterprises that are lacking some functionality or simply want more control over applications have begun to realize that object-oriented frameworks can provide them with an easy way to create their own software packages that are specific to their situations. Object-oriented frameworks combine the benefits of objects (easy maintenance, upgrades, and extensions) with the benefits of a pre-built, related group of objects that provide specific functionality. Because frameworks are a reusable set or collection of classes that work together to provide a commonly needed function, much of the creation and debugging of the software has been done. The enterprise need only add the specific functionality not provided by the framework. This dramatically reduces coding and debugging time. Thus, frameworks provide enterprises with what they want-software that is easily maintained, upgradable, easily written, and specific to their situation-while reducing the time necessary to create this software.

Similarly, enterprises have also found databases to be easily adapted to support their needs. Databases allow a user to access information, and databases can be programmed for the particular enterprise's uses. Object-oriented databases are now also popular, due to the benefits of object-oriented programming. The underlying software that supports retrieval of objects or information has already been developed and thoroughly tested in databases; the enterprise need only add their interface to the database. Thus, databases provide easily adaptable accesses to information.

While object-oriented frameworks and databases provide many benefits, there are certain situations where the performance of the framework or database is less than ideal. This is particularly true when using one object that uses other objects (for clarity, these objects will be called "sub-objects") to access a value that is "within" other objects in the framework or within the database. These "data accessing" objects point to or reference a value by using criteria determined by sub-objects. In other words, the data accessing object can be used to access and update the value pointed to by the data accessing object and determined by the criteria. If the criteria in the sub-objects change, a different value may be accessed. When updating a value, a data accessing object that references the value is passed to an object in the framework or to a database. The object in the framework or the database must then determine if the value is within itself and able to be updated. To do this, the object in the framework or the database generally compares the criteria in the data accessing object to criteria that determine if the value is within the framework or database. In this manner, the object in the framework or the database then can determine if they have the value and can update the value.

Before updating a value, the data accessing object creates, initializes, and populates all sub-objects (which contain criteria through which the correct value is pointed to or chosen). Furthermore, the data accessing object might have to determine the criteria from additional objects and use it to populate the sub-objects. Thus, before the value can be accessed, the data accessing object must be created and initialized, the sub-objects must be created and initialized, and the criteria must be determined and used to populate the sub-objects.

In certain cases, all of these sub-objects and their criteria may be necessary to access the value. For example, if the balance of a very simple financial account is desired, the only sub-object necessary might be the account number object or data. This account number object then points to, or allows access to, the account balance. These sub-objects and their criteria may also be needed when accessing very specific values. For instance, if a multinational car dealership wants to know the number of cars having a certain engine size that is in a specific type of red car on the new car lot of its only dealership in Germany, all of the sub-objects needed to access this value will be needed.

In many instances, however, much of this criteria is unnecessary. In the account example, while the account number itself is necessary to access the account balance, all of the other criteria about the account (date opened, date balanced, number of entries, etc. ) is usually superfluous. Similarly, if the multinational dealership simply wants to know how many cars the Germany dealership has, the Germany dealership is really the only necessary object. All of the other criteria are extraneous.

Inefficiencies arise in these situations because all of the sub-objects (that contain the criteria) are created, initialized and populated (with criteria determined from another object) during creation of the data access object that is being used to access and update a value. For instance, if the number of red cars in Germany is being updated, a data access object that points to this value will be created. This data access object is compared to the database or framework object to see if the number of red cars in Germany needs to be updated. If the database is strictly a database of cars in America, then the number of red cars in Germany is irrelevant. Regardless, when creating the data access object that informs the database or framework object which value is to be updated, the entire data access object, including all of its sub-objects, is created and initialized.

Many of the sub-objects, however, may not be necessary to access the desired value. If all one cares about is the number of red cars in Germany, then all of the other criteria associated with the Germany dealership (how many employees, etc.) are really not needed. For a complex business application made of a framework or when updating multiple databases, creating all of the extra sub-objects that hold these extraneous criteria can be extremely time consuming and inefficient.

In addition, there are often many copies of the value that need to be updated. For instance, one object may point to the number of total cars owned by the previously discussed multinational dealership, another object may point to the number of cars owned by the German subsidiary, while still another object may point to the number of red cars owned by the German subsidiary. If the German subsidiary sold one red car, an update to the number of red cars owned by the German subsidiary will have a ripple effect through the other values. When updating these values, the framework or database accesses can experience even more inefficiencies. Many objects, such as databases, that have a copy of the value (or another value that is affected by the value) must first copy the data accessing object because they may change sub-objects. For example, if a criterion of the data accessing object is "red cars, " the database may have this criterion marked as "do not care," meaning that any color car is fine. The database may then change "red cars" to "do not care." If the original data accessing object is modified in this manner, subsequent updates to entities that have copies of the value may not be correctly performed. Thus, all the criteria held by the sub-objects must be copied to another version of the data accessing object. This copying can be slow. In addition, once the copy is complete, the criteria for the new data accessing object are compared against the criteria for the framework/database to determine if the value is within the framework/database. This comparison can be slow, and a large portion of it unnecessary, when only a few of the sub-objects are used to access the value.

While using data access objects that use other sub-objects for the needed criteria to reference values allows these values to be easily updated and found, creating the data access object and copies of this object when updating a value can be time-consuming and inefficient. The inefficiencies occur because all of the sub-objects used to hold criteria are created and copied, even though only a small subset of the total criteria may actually be important when accessing the value. Without a method and apparatus for improving these inefficiencies, updates on values referenced by data accessing objects will be needlessly slow and inefficient.

DISCLOSURE OF INVENTION

The preferred embodiments of the present invention provide a method and apparatus for dynamically loading criteria from an object to reduce the amount of total criteria necessary to update a referenced value. The value can be "inside" a database or an object in an object-oriented fiamework. When updating a value that is referenced by a data access object (such as an access key) that depends on other objects (such as access keyables) for criteria necessary to reference the value, a special data access object (called an adapter access key) is used instead of using the data access object. Instead of creating and populating all of the access keyables prior to an update of the value, the adapter access key holds onto the source of the criteria (such as a business object) needed to fill the access keyables and to access the value. The adapter access key dynamically determines criteria from the business object only for those keyables that are important in updating the value. This reduces the comparison time that used to occur when the criteria in the access key was compared to criteria that determined if the value was "within" a database or an object in an object-oriented framework, or if the data access object pointed to the value. Preferably, there is a facsimile (such as with a boolean array) of keyables that is marked in such a way that the adapter access key can be easily reset and used for multiple updates. This eliminates copying of the original key and minimizes comparison time.

The foregoing and other features and advantages of the present invention will be apparent from the following more particular description of the various preferred embodiments of the invention, as illustrated in the accompanying drawings.

BRIEF DESCRIPTION OF DRAWINGS

The preferred exemplary embodiments of the present invention will hereinafter be described in conjunction with the appended drawings, wherein like designations denote like elements, and.

BEST MODE FOR CARRYING OUT THE INVENTION

Figure 1:
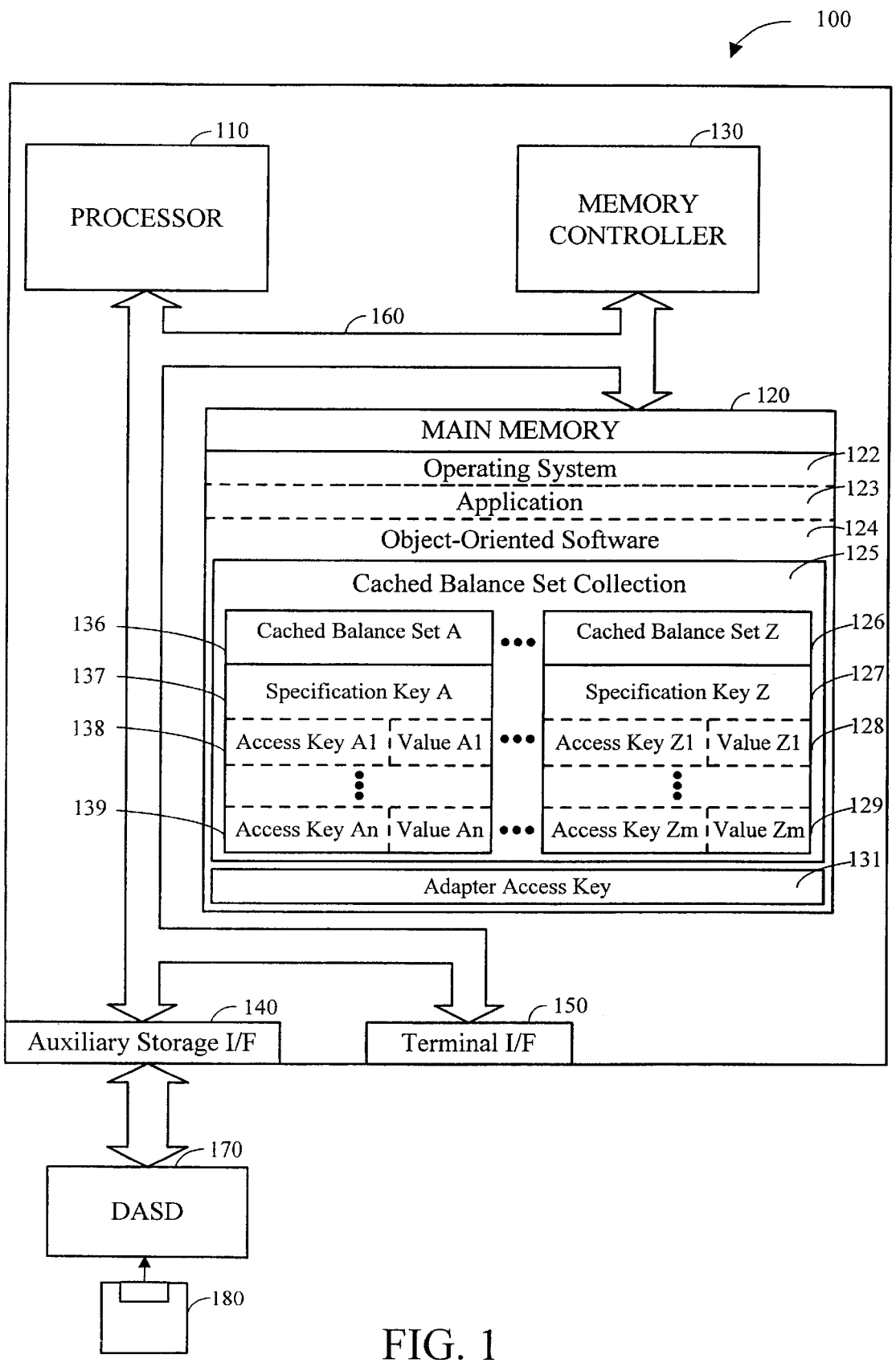
FIG. 1 is a computer system containing a business application framework in accordance with a preferred embodiment of the present invention.

This application relates to two copending applications, "FRAMEWORK FOR BUSINESS APPLICATION USING CACHED AGGREGATE AND SPECIFICATION KEY", and "ACCESS KEY OBJECTS." Furthermore, this application and the copending applications add to an object-oriented software framework. A brief description of some of the important elements in the copending applications will be given in the Overview section below before the detailed description section of the current invention is given. In addition, a review of object-oriented concepts and object-oriented frameworks will be given.

Overview—Object-Oriented Technology

As discussed in the Background section, the present invention was developed using Object-oriented (OO) framework technology. Individuals skilled in the art of OO framework technology may wish to proceed to the Detailed Description section of this specification. However, those individuals who are new to framework technology, or new to OO technology in general, should read this overview section in order to best understand the benefits and advantages of the present invention.

Object-oriented Technology v. Procedural Technology

Though the present invention relates to a particular OO technology (i.e., OO framework technology), the reader must first understand that, in general, OO technology is significantly different than conventional, process-based technology (often called procedural technology). While both technologies can be used to solve the same problem, the ultimate solutions to the problem are always quite different. This difference stems from the fact that the design focus of procedural technology is wholly different than that of OO technology. The focus of process-based design is on the overall process that solves the problem; whereas, the focus of OO design is on how the problem can be broken down into a set of autonomous entities that can work together to provide a solution. The autonomous entities of OO technology are called objects. Said another way, OO technology is significantly different from procedural technology because problems are broken down into sets of cooperating objects instead of into hierarchies of nested computer programs or procedures.

The Term Framework

There has been an evolution of terms and phrases which have particular meaning to those skilled in the art of OO design. However, the reader should note that one of loosest definitions in the OO art is the definition of the word framework. The word framework means different things to different people. Therefore, when comparing the characteristics of two supposed framework mechanisms, the reader should take care to ensure that the comparison is indeed "apples to apples." As will become more clear in the forthcoming paragraphs, the term framework is used in this specification to describe an OO mechanism that has been designed to have core function and extensible function. The core function is that part of the framework mechanism that is not subject to modification by the framework purchaser. The extensible function, on the other hand, is that part of the framework mechanism that has been explicitly designed to be customized and extended by the framework purchaser.

OO Framework Mechanisms

While in general terms an OO framework mechanism can be properly characterized as an OO solution, there is nevertheless a fundamental difference between a framework mechanism and a basic OO solution. The difference is that framework mechanisms are designed in a way that permits and promotes customization and extension of certain aspects of the solution. In other words, framework mechanisms amount to more than just a solution to the problem. The mechanisms provide a living solution that can be customized and extended to address individualized requirements that change over time. Of course, the customization/extension quality of framework mechanisms is extremely valuable to purchasers (referred to herein as framework consumers) because the cost of customizing or extending a framework is much less than the cost of a replacing or reworking an existing solution.

Therefore, when framework designers set out to solve a particular problem, they do more than merely design individual objects and how those objects interrelate. They also design the core function of the framework (i.e., that part of the framework that is not to be subject to potential customization and extension by the framework consumer) and the extensible function of the framework (i.e., that part of the framework that is to be subject to potential customization and extension). In the end, the ultimate worth of a framework mechanism rests not only on the quality of the object design, but also on the design choices involving which aspects of the framework represent core function and which aspects represent extensible function.

Overview of Copending Applications

The current invention relates to access keys, specification keys, cached balance sets, and cached balance set collections. These elements build on one another to create a powerful software framework. These items will be discussed in order of introduction.

An access key is a data access object that uses or contains access keyable objects. Each access keyable can contain one criterion (of many criteria). This criterion generally pertains to the types of data represented by the access keyable. For instance, in describing cars that a dealer has, it may be beneficial to know the color of cars. The criterion in this case could be "red." This criterion would be chosen from a set of criteria, such as "red" and "brown," for a simple set of colors. There is only one criterion allowed per access keyable. The keyable that relates to colors would then represent "red" or "brown." The access key, as a data access object, allows a data value to be accessed and updated. In this way, the number of red cars that the dealer has may be ascertained by using the access key to determine the number of red cars. The access key is essentially a complex pointer (in computer terminology) or a vector (in mathematical terms) that maps to one particular "point" in space. The access key, however, does not necessarily contain that point. In other words, while the number of red cars may be determined by using the access key, the actual number of red cars is generally only pointed to by the vector (the access key).

A specification key "contains" a number of access keys. The specification key is best described as a description of a volume. In that volume are points (values) that are pointed to by access keys. Thus, the specification key may be used to determine if an access key points to a value within the volume defined by the specification key. For instance, in the very simple previous example, the points that indicate the number of red and brown cars would be encompassed by the volume described by a specification key. Each specification comprises specification keyables, each specification keyable able to specify none, one, many, or all predetermined criteria for that specification keyable. This is discussed in more detail below.

The volume encompassed by the specification key can be varied by having the specification key be complete or incomplete. A complete specification key containing cars, for example, would have locations for vectors that point to the number of red and brown cars. A complete specification key defines the entire volume but may have vectors marked with "not in specification." If the specification key marks blue cars as "not in specification," then any inquiry about blue cars will receive a "not in specification" return. Any inquiry about the number of red cars, on the other hand, could determine the number of red cars. An incomplete specification key will define only that volume that actually points to a value that is in specification. For instance, an incomplete specification key for the previous example might not contain a vector that points to the number of brown cars but, instead, could contain a vector that points to the number of red cars. There are various methods of handling an instance when the number of brown cars is requested and there is no vector pointing to this value. For instance, a NULL could be returned or an includes function (discussed below) could be executed to determine if the vector points to the value.

A cached balance set may be thought of as both a volume (of vectors) and the points in that volume. Whereas the access key is a map to a value, a cached balance set is both a map to values and the values themselves. A cached balance set contains a specification key that delineates the volume encompassed by the cached balance set. A cached balance set could contain an access key that points to the number of red cars, and also contain the actual number of red cars. In this way, an object can query the cached balance set and get back all data values for all access keys associated with a specification key (which delineates the volume encompassed). For instance, a query on a cached balance set that contains a complete specification key for the two-colors-of-cars example would return the number of red and brown cars (although one or both may be denoted "not in specification").

A cached balance set collection is a collection of cached balance sets. As such, it can be thought of as a collection of volumes. When the cached balance set collection is told to update a value pointed to by an access key, the cached balance set collection iterates through each cached balance set, causing each cached balance set to update, if possible, the value. This will be described in more detail below.

Figure 7:
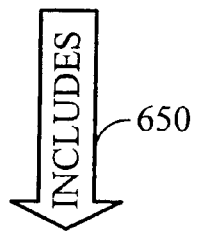
FIG. 7 is an illustration of inclusion.
Figure 7:
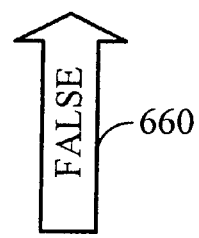
Figure 7:
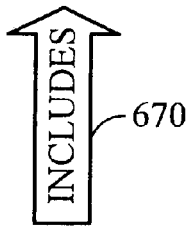
Figure 7:
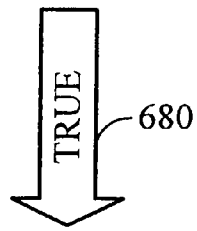

Before proceeding further, it is helpful at this point to review the inclusion and conversion functions associated with specification keys. The inclusion (or include, includes) function accepts an access key and determines if the access key is within the volume delineated by a specification key. In a previous example, the number of brown cars was requested, but there was no vector pointing to this value. The includes or inclusion function could determine if the access key (the vector) is available in the cached balance set collection prior to an application's attempting to access the number of brown cars pointed to by the access key. FIG. 7 has two examples of two access keys and the result generated by an inclusion function. Example 600 has access keys 610 and 630, and specification key 640. Incomplete specification key 640 ignores the order number and delivery type but contains all customers and the accepted and shipped order status. The latter is called a "Dynamic Set", in that more than one keyable specific value is specified. The "ignored" indicates an unused position.

If an include function 650 is run using access key 610 and specification key 640, a FALSE 660 will be returned. The order status (on hold) for access key 610 is not within the dynamic set of order status variables (accepted, shipped). Thus, access key 610 is not in the volume (of vectors) delineated by specification key 640. On the other hand, if an include function 650 is run using access key 630 and specification key 640, a TRUE 680 will be returned. The order status (accepted) for access key 630 is within the dynamic set of order status variables (accepted, shipped). In addition, the customer (alpha) is within the set of all customers, and the specification key ignores order number and delivery type. Thus, access key 630 is within the volume (of vectors) delineated by specification key 640.

Conversion is similar to inclusion, but conversion can "filter" access keys in different ways. When a value is to be updated, the value and the access key that points (as a vector) to that value are passed to the cached balance set collection. The cached balance set collection then passes these objects to each cached balance set. Each cached balance set converts the access key by filtering it through the specification key to end up with a key that is one of the vectors (access keys) in the volume delineated by the specification key. This converted key can then be used to update the value. If the key cannot be converted, which means that the access key is not in the volume delineated by the specification key, the conversion fails. Conversion has many uses, but the main use discussed herein will be to update cached balance sets. Some general examples will, however, be given before proceeding to the update process. How a keyable is converted during the process of conversion is shown in the following table.

| Specification Keyable | Conversion Result |
| --- | --- |
| All Values | The passed in Access Keyable is returned. |
| Ignored | The passed in Access Keyable is replaced with a No Value Needed Keyable. |
| Specific Value | If the passed in Access Keyable equals the Specific Value, it is returned, otherwise NULL (if the Specification Key is incomplete) or Not In Specification (if the Specification Key is complete) is returned. |
| Dynamic Set | If the passed in Access Keyable is in the set, it is returned, otherwise NULL (if the Specification Key is incomplete) or Not In Specification (if the Specification Key is complete) is returned. |
| Range | If the passed in Access Keyable is within the range (including the end points) of the Specific Value, it is returned, otherwise NULL (if the Specification Key is incomplete) or Not In Specification (if the Specification Key is complete) is returned. |
| Dynamic Set and Range | If the passed in Access Keyable is within any range or in the set, it is returned, otherwise NULL (if the Specification Key is incomplete) or Not In Specification (if the Specification Key is complete) is returned. |

Figure 8:
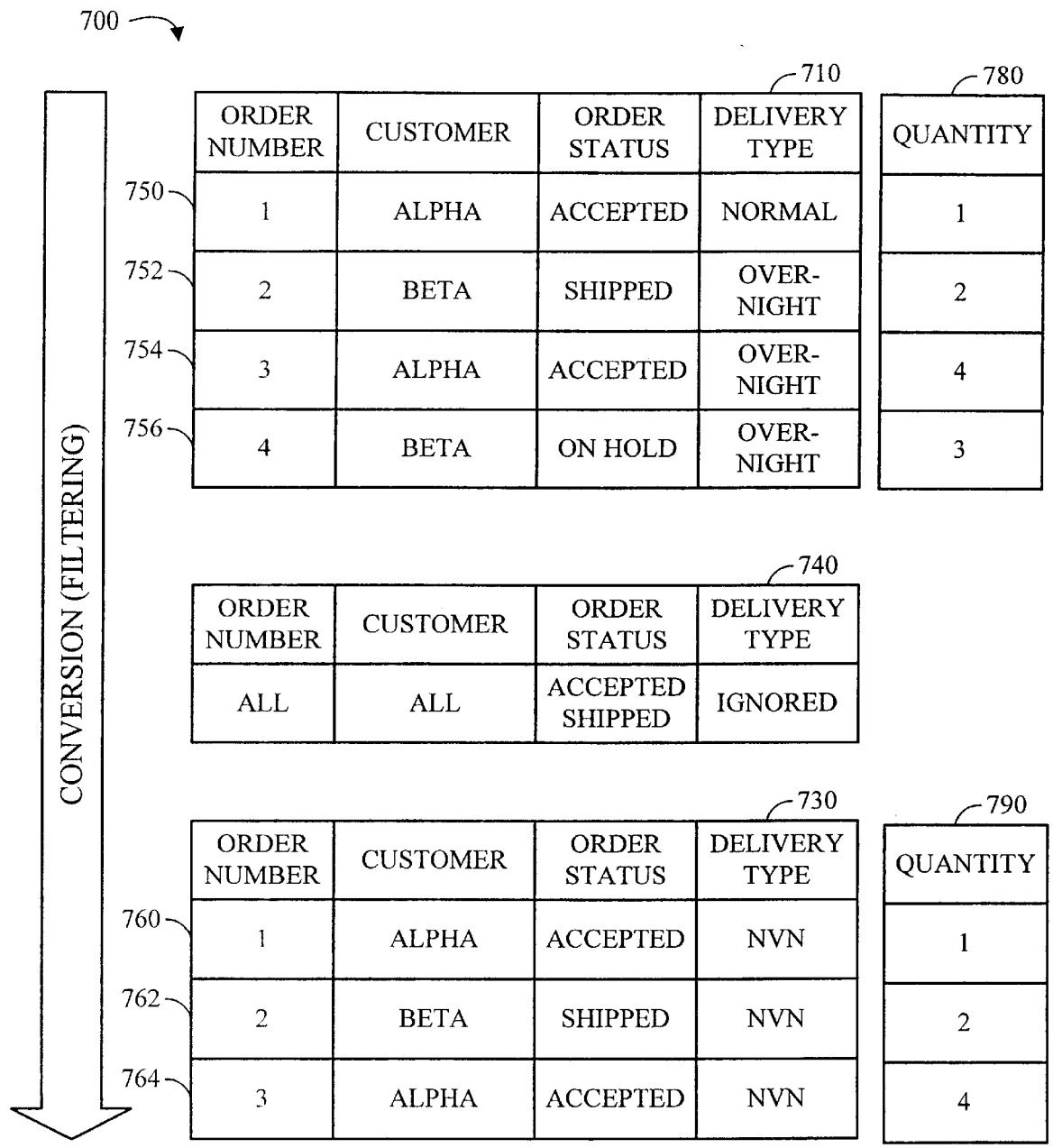
FIGS. 8, 9 and 10 are examples of conversions.
Figure 9:
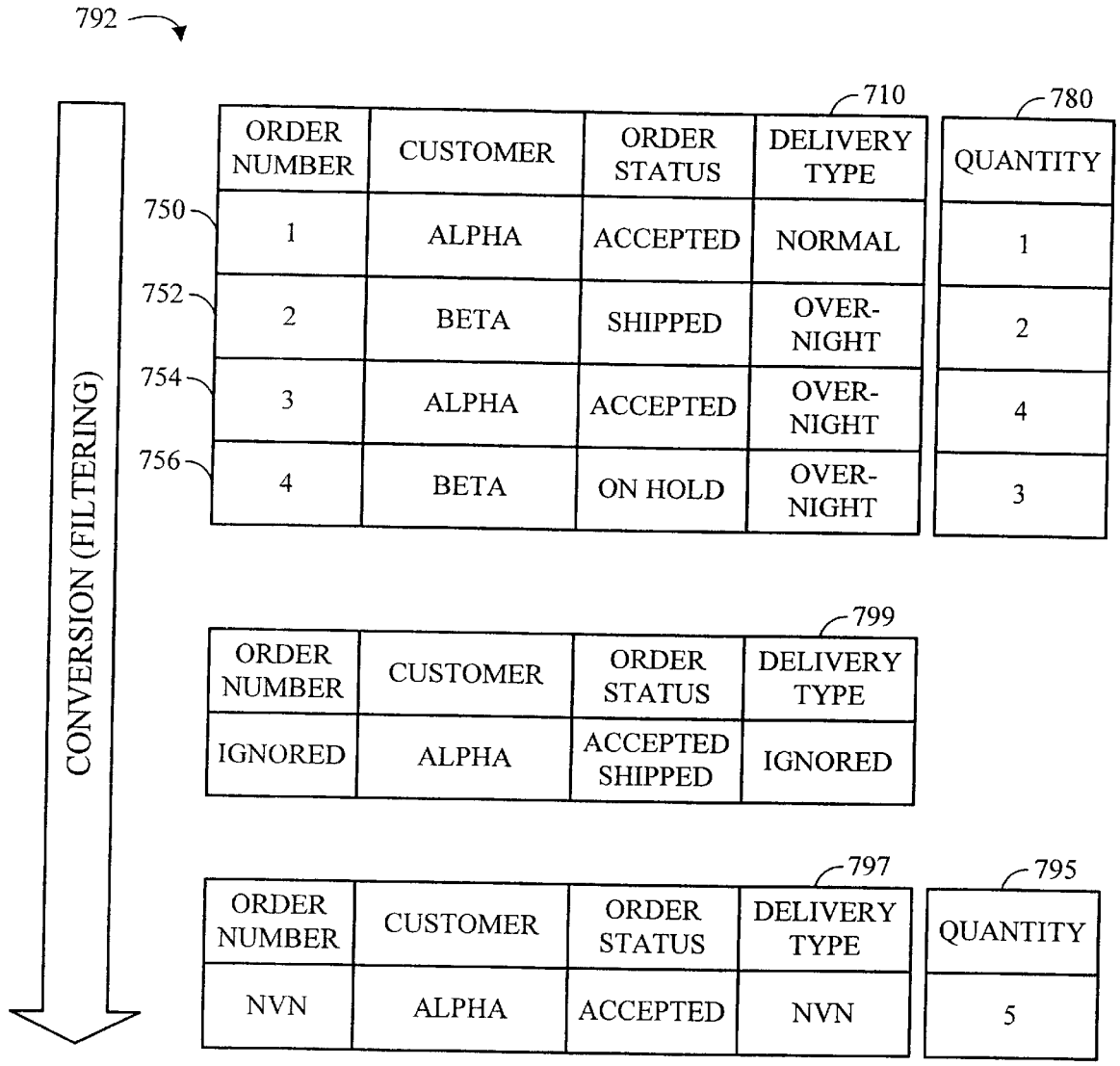
Figure 10:
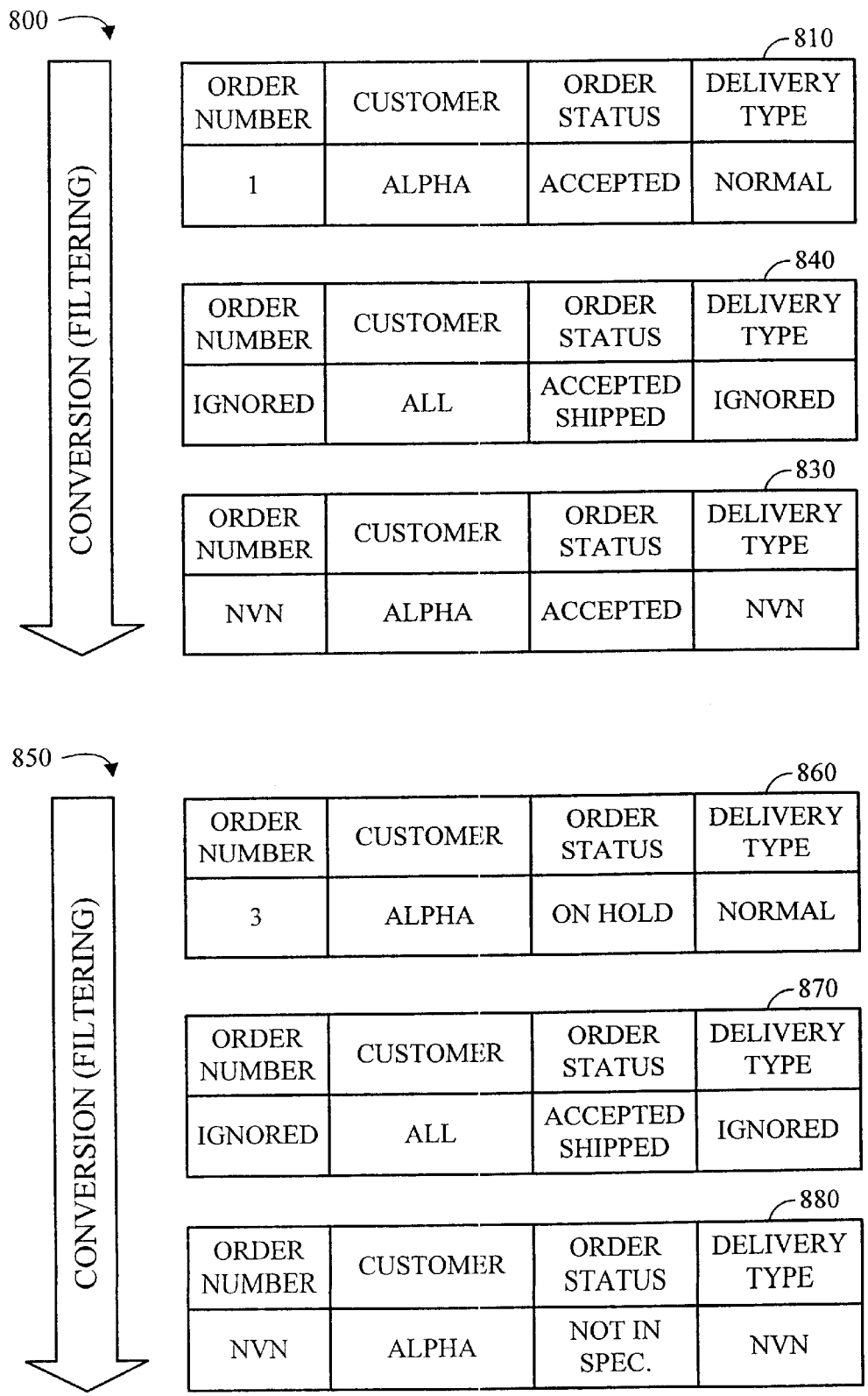

FIGS. 8, 9 and 10 illustrate some examples of the conversion process. FIGS. 8 and 9 illustrate filtering multiple access keys through one specification key, while FIG. 10 shows two different access keys being filtered through certain specifications keys.

Turning now to FIG. 8, access keys 710 are being "filtered" through incomplete specification key 740 to create filtered access keys 730. This is an example of condensation, which is taking a large map and summing it into a higher level. Access keys 750, 752, 754, and 756 are filtered through specification key 740 to create filtered access keys 760, 762, and 764. The data elements pointed to by the access keys are shown as quantities 780. Access key 756 did not convert because the "on hold" order status is not in the ordered status for specification key 740, which has a dynamic set of "accepted" and "shipped." Thus, a conversion on access key 756 would fail. The other three keys are converted, but note that "delivery type" has been changed or converted to NVN (No Value Needed) as per the above table. Quantities 790 are the same quantities 780 with the exception that the quantity for access key 756 was filtered out. FIG. 8 illustrates that filtering a map of access keys through an incomplete specification key can result in a smaller, slightly changed map of access keys. Note that if specification key F740 were complete there would be another converted access key in filtered access keys 730 that would contain an order number of 4, a customer of beta, an order status of "Not in Specification," and a delivery type of NVN. In this example with a compete specification key, there would be no filtering (all keys pass through), only conversion.

An example of condensation is shown in FIG. 9. Condensation occurs because several access keys are combined into one access key. In addition, FIG. 9 also shows filtering. Incomplete specification key 740 has been changed so that the order number keyable is ignored and the customer keyable is alpha. Access keys 752 and 756 have been filtered out (because they have customer keyables of beta). Access keys 750 and 754 have been condensed during the process of conversion to yield one converted access key 797. The converted access key has an order number of NVN, a customer of alpha, an order status of accepted, and a delivery type of NVN. In addition, the quantities pointed to by access keys 750 and 754 (quantities 780 of 1 and 4, respectively) would be summed into a summed quantity 790 of 5. This is called condensation because access keys 750 and 754 are being condensed into one converted access key 730 that references a larger quantity 795.

Turning now to FIG. 10, this figure illustrates potential conversion differences between complete and incomplete specification keys. Conversion 800 shows an access key 810 that has been filtered through an incomplete specification key 840 into a converted access key 830, while conversion 850 shows an access key 860 that has been filtered through a complete specification key 870 into a converted access key 880. Note that the values that each access key references are not shown in FIG. 10. In conversion 800, specification key 840 will essentially pass all access keys except those that do not contain the order status keyables of accepted or shipped. This pass through occurs because the order number and delivery type are ignored, while all customers will be passed through. The only keyable that contains a limitation is the order status, which is accepted or shipped. Because the specification key is incomplete, access keys that do not have order status keyables of accepted or shipped will be filtered out. In this example, access key 810 has an order status of accepted, so the key is converted. If the key had a different order status (e.g., on hold), the access key would have been filtered out and conversion would have failed.

In conversion 850, specification key 870 has the same keyables as specification key 840, only specification key 870 is complete. A complete specification key still delineates a volume, but will contain all the possible volume that can be delineated. Any access keys (and keyables) that are not in the actual delineated volume will be marked as "Not In Specification." This process is shown in conversion 850, where access key 860 filters through complete specification key 870 even though the order status keyable of on hold for access key 860 is not accepted or shipped. Because the order status is not accepted or shipped, the order status for converted access key 880 is "Not In Specification." Had specification key 870 been incomplete, the conversion of access key 860 would fail because the order status keyable was not in the dynamic set of accepted or shipped keyables in the specification key. Failure of conversion is generally indicated by returning a NULL instead of returning a reference to converted access key 880. Note that there will generally be a value (not shown in FIG. 10) associated with access key 880.

Figure 11:
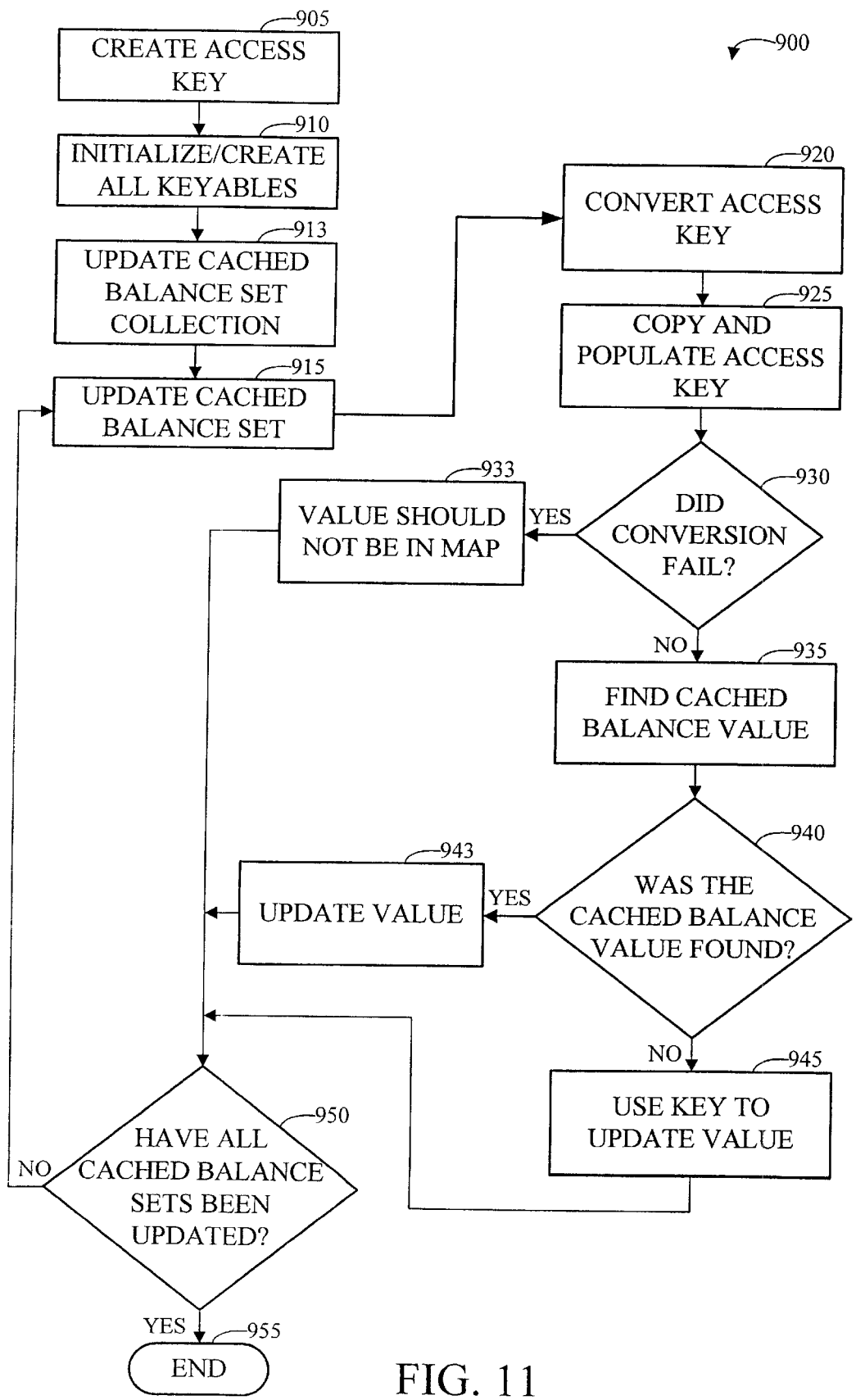
FIG. 11 is a flow diagram of one method for updating cached balance sets.

Referring now to FIG. 11, a method 900 for updating cached balance set collections is shown. Method 900 is used when a value pointed to by an access key needs to be updated. For instance, if the number of blue cars has decreased by one car, this value needs to be updated to reflect the reduction in cars. An access key that points to the value and the value are passed to a cached balance set collection object, which then informs each cached balance set that it needs to update this value. The cached balance set collection object passes the access key and value to each cached balance set. Each cached balance set then converts the access key for use in its own cached balance set and uses the converted key to update the value.

Method 900 starts when an access key is created (step 905) by calling a constructor. After (or during) key creation, all keyables are created, initialized, and essentially populated. To initialize the keyables, the access key determines from a BusinessObject all the data needed to create all of the keyables. This occurs in step 910. Thus, the access key at this point is fully initialized. Next, an application would pass the access key and the new value to the cached balance set collection (step 913). The cached balance set collection iterates through all of the cached balance sets, passing each cached balance set the access key and value (step 915). Each cached balance set converts the access key (step 920). To avoid changing the access key, a copy of the key is made, which essentially means that a new key is created and the access keyables are copied to the new key (step 925). In this manner, the new key can be converted without destroying the old key. The old key maintains its initial value, which is important as it is passed to each cached balance set.

If the convert fails (step 930=YES), the value is not the in the map (the cached balance set collection), step 933, and a determination is made as to if all cached balance set collections have been updated (step 950). If all cached balance sets have been updated, the method ends (step 955). Conversely, if all cached balance sets have not been updated, the next cached balance set is updated (step 915).

If the conversion occurs (step 930=NO), an attempt is made to find the cached balance value in the map (the cached balance set). This happens in step 935. If the cached balance value is found, it is updated in step 943. If the cached balance is not found, a new value is created in the map and set to an initial value, then the passed-in value is added to the initial value (step 945). Now, there is a value in the map.

While method 900 is advantageous because all cached balance sets can be updated, there are some inefficiencies involved. For instance, in step 910 all keyables are created and populated. This process involves creating quite a number of keyable objects and determining criteria from another object (a BusinessObject) to initialize the keyables. The BusinessObject can be used to access other BusinessObjects to determine the criteria used to populate the keyables. Creating all keyables is beneficial if all the keyables are needed, but can be very time consuming if many of the keyables are unnecessary. For instance, if all one cares about is the balance in an account, all one really needs to find the balance is the account number. All of the other criteria that goes along with the account, such as when the account was created, the number of entries in the account, when the account was last balanced or audited, etc., are not necessary to find the balance in the account. The process of creating, initializing, and populating all of these extraneous keyables is time consuming and processing intensive.

Similarly, in step 925 a copy of the access key is made. The process of copying the keyables is also time consuming. This is particularly true because a copy is made by each cached balance set, for each update of a cached balance set. Copying the keyables and criteria numerous times is inefficient.

Thus, a framework can be made that provides keyables for access keys. Each access key can be made to reference or point to a particular piece of data. Specification keys can be provided by the framework that allow a volume of data to be described, and that can be used to determine if an access key points to a value in that volume. Cached balance sets then provide maps from access keys to the values pointed to by those keys. Cached balance sets allow multiple cached balances to be conveniently updated and accessed. Even though this is a powerful application framework, updating cached balance sets can be inefficient if the all the keyables are not needed.

DETAILED DESCRIPTION

The preferred embodiments of the present invention provide a method and apparatus for dynamically loading criteria from another object to reduce the amount of total criteria necessary to update a referenced value. When updating a value that is pointed to by a data access object (an access key) that depends on other objects (access keyables) for criteria necessary to point to the value, an adapter object (an adapter access key) is used instead of the access key. Instead of creating and populating all of the access keyables, the adapter access key holds onto the source of the data (a business object) needed to fill the access keyables. The adapter access key determines criteria from the business object only for those keyables that are used to update the value. Preferably, there is a facsimile (such as with a boolean array) of keyables that is marked in such a way that the adapter access key can be easily reset and used for multiple updates. This eliminates copying of the original key and minimizes comparison time.

By using the adapter access key to update cached balance set collections, no copying of the adapter access key is needed for each update of a cached balance set. The adapter access key is used as is for each update, and a simple reset of the key is all that is necessary for reuse. In addition, if access keys are made (if the value updated is not found in the cached balance set), the time involved with extracting criteria to fill the keyables is reduced because keyables that are not necessary (marked as No Value Needed) do not have to have their data extracted from the business object. In this manner, the only the keyables that should be filled actually are filled, and the rest are simply set with the correct attribute (such as No Value Needed).

Referring now to FIG. 1, a computer system 100 in accordance with a preferred embodiment of the present invention is a single processor computer system. However, those skilled in the art will appreciate that the methods and apparatuses of the present invention apply equally to any computer system, regardless of whether the computer system is a complicated multi-user computing apparatus or a single user device such as a personal computer or workstation. Computer system 100 suitably comprises a processor 110, main memory 120, a memory controller 130, an auxiliary storage interface 140, and a terminal interface 150 all of which are interconnected via a system bus 160. Note that various modifications, additions, or deletions may be made to computer system 100 illustrated in FIG. 1 within the scope of the present invention. For instance, a network interface could be added that connects computer 100 to another computer. FIG. 1 is presented to simply illustrate some of the salient features of computer system 100.

Processor 110 of computer system 100 performs computation and control functions of computer system 100, and comprises a suitable central processing unit (CPU). Processor 110 may comprise a single integrated circuit, such as a microprocessor, or may comprise any suitable number of integrated circuit devices and/or circuit boards working in cooperation to accomplish the functions of a processor. Processor 110 may also be any number of separate processors. Processor 110 suitably executes an operating system 122 within main memory 120. Operating system 122 can be any operating system able to run an application and communicate over a network, such as Unix, Linux, OS/2, WINDOWS CE, WINDOWS 95 or 98, etc. Operating system 122 controls the basic functions of computer system 100.

Preferably running with and being controlled by operating system 122 are an application 123 and an object-oriented software 124. Object-oriented software 124 is instantiated from an object-oriented framework. In general, application 123 will be software that comprises many of the classes in object-oriented software 124. As such, the application then provides additional functionality and external interfaces that wrap the core functionality provided by object-oriented software 124. Object-oriented software 124 comprises a cached balance set collection 125 and an adapter access key 131. While FIG. 1 is a valuable aid in understanding the invention, the figure is not meant to indicate actual locations and object relationships. Object-oriented software framework 124 can comprise, and usually will comprise, multiple cached balance set collections. In the example of FIG. 1, only cached balance set collection 125 is shown.

Cached balance set collection 125 in this example comprises a multitude of cached balance sets (A–Z), shown as cached balance set 136 and 126. Each cached balance set is a map from an access key to a value. There can be many entries for access keys and values. In this example, cached balance set 136 has entries Al (entry 138) to An (entry 139), while cached balance set 126 has entries Z1 (entry 128) to Zm (entry 129). Each entry contains an access key and a value. For instance, entry 138 contains access key A1 and value A1. Similarly, entry 129 contains access key Zm and value Zm. Although shown as entries and arrays, because access keys point to values, there is really no need to order the access keys and arrays as shown in FIG. 1. Those skilled in the art will realize that the actual storage can vary significantly from what is shown in FIG. 1.

Each cached balance set has a specification key that delineates the volume (of values and the vectors—access keys—that point to those values) encompassed by the cached balance set. In the example of FIG. 1, cached balance set 136 has specification key 137, while cached balance set 126 has specification key 127. As stated in the Overview section, the specification key can be used to determine if an access key is within its delineated volume. In addition, an access key can be converted by using the specification key, the conversion making the access key suitable for use in the map defined by the cached balance set. Examples of previous types of conversion were described in the Overview section in reference to FIGS. 8–10.

Each access key in a cached balance set's map points to one and only one value in the map. Each access key depends on a set of criteria that are included in the set of keyables (not shown in FIG. 1) owned or referenced by the access key. Each keyable is an object that wraps a criterion. There is only one criterion per keyable. Each criterion and keyable are in one and only one order (the same order that the specification key is in). The order of criteria and keyables are arbitrary, but the specification key and the access key must be in the same order. For instance, if the access key has "red" as a color keyable and "Europe" as a country keyable (in this order), then the specification key's keyables (not shown in FIG. 1) must also be in that order. If this were not the case, the color "red" could be compared to "all" countries, which would not make sense. Because each access key depends on a certain pre-determined number of keyables, and each keyable wraps only one criterion, each access key can only reference one value.

Previously, if a value needed to be updated, an access key that points to the value would be created and populated with all keyables (not shown in FIG. 1). The access key and the value would be passed to the cached balance set collection, which would iterate through each cached balance set, passing the access key and value to each cached balance set. Each cached balance set would then make a copy of the access key and then convert the key. Conversion both determined if the key was in the volume delineated by the specification key (and, thus in the map defined by the cached balance set) and converted the access key for use in the volume. To determine inclusion, each keyable of the specification key was compared to each keyable in the access key. This was a time consuming process. After an access key was converted, the value could be updated. For more details on this process, see the text associated with FIG. 11 in the Overview section.

In the current invention, adapter access key 131 is used in place of an access key when updating a value. Adapter access key 131 holds onto an object (not shown in FIG. 1) through which all of the criteria needed to populate the keyables may be determined. The adapter access key uses a facsimile of keyables (access key criteria) that is marked such that keyables that are not important are marked as such, and only those important keyables are populated when needed. In this manner, less keyables are created and populated, no copies of the access key are made (the key may be easily reset), and only those important keyables are compared to keyables in the specification key. In addition, if there is no value in the map, key creation is simplified because only the important keyables are created and populated for the key. These concepts will be discussed in more detail below.

Auxiliary storage interface 140 of FIG. 1 allows computer 100 to store and retrieve criteria from auxiliary storage devices, such as a magnetic disk (e.g., hard disks or floppy diskettes) or optical storage devices (e.g., CD-ROM). One suitable storage device is a direct access storage device (DASD) 170. As shown in FIG. 1, DASD 170 may be a floppy disk drive which may read programs and data from a floppy disk 180.

It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media to actually carry out the distribution. Examples of signal bearing media include recordable type media such as floppy disks (e.g., disk 180) and CD ROMS, and transmission type media such as digital and analog communication links, including wireless communication links.

Memory controller 130 is responsible for control signals to move, store, and retrieve requested data from main memory 120 and/or through auxiliary storage interface 140 to processor 110. While, for the purposes of explanation, memory controller 130 is shown as a separate entity, those skilled in the art understand that, in practice, portions of the function provided by memory controller 130 may actually reside in the circuitry associated with processor 110, main memory 120, and/or auxiliary storage interface 140.

Terminal interface 150 is an interface that allows external devices, such as mice, monitors, keyboards, etc. to be connected to client 100 and that allows human interface with client 100. Although shown as one block, those skilled in the art will realize that many different components may actually make up terminal interface 150.

Although the present invention is described herein as related to an object-oriented framework, the preferred embodiments of the present invention may also be extended to databases. When updating values in a database, the database must first determine if the value is in the information contained in the database. Then, once the database determines that the value is within the database, the database can update the value. Because this process, particularly for object-oriented databases, is very similar to those outlined in the present invention, the present invention will speed updates to values in a database. The present invention has particular application to those times when multiple databases will be updated, as it allows fast determinations as to whether the value is within the database and allows quick updating of the value.

To describe this in reference to the example of FIG. 1, instead of having multiple cached balance sets (such as cached balance set A 136 and cached balance set Z 126), a single or multiple databases could exist in memory 120. Memory 120 would then comprise operating system 122, application 123, and multiple databases. Additionally, there also could be a "database supervisor" that allows access to the multiple databases. In the latter case, the database supervisor would inform each database to update a value in a manner similar to those disclosed in the current invention. Alternatively, application 123 could inform each database that a value needs to be updated. The method used to inform the databases to update the value and used by the database to update the value in the database is described herein in reference to updating cached balance set collections and the cached balance sets therein.

In addition, although FIG. 1 acts as a very good representation of a particular object-riented software framework, the present invention should increase the speed of updating any value that is referenced by a data access object. A data access object is an object that determines criteria from other objects and that uses that criteria to reference a value. The adapter access key can attempt to update the value by accessing the object and determining criteria from that object dynamically (when necessary for comparison purposes). The dynamically determined criteria can then be compared versus the data access object's criteria to determine if the data access object points to the value that needs updated or if data access object is not in the memory of the computer and needs to be added to the memory along with the value. Even when updating only one value referenced by a data access object, there should be a speed improvement because only some criteria of the set of data access object criteria are dynamically determined, and the rest are simply determined by examining the data access object's criteria.

The adapter access key does have its best application in a configuration such as FIG. 1, however. Here, there are multiple maps (cached balance sets, such as cached balance sets 136, 126) that may need values updated. There are multiple data access objects (access keys in entries 138, 139, 128, and 129) that point to multiple values (in entries 138, 139, 128, and 129), both of which are in cached balance sets. In addition, there are specification keys that provide a guide as to which access keys can be in the cached balance set. In this format, the adapter access key will provide additional benefits because of the sheer number of comparisons that will take place when updating multiple cached balance sets.

Figure 2:
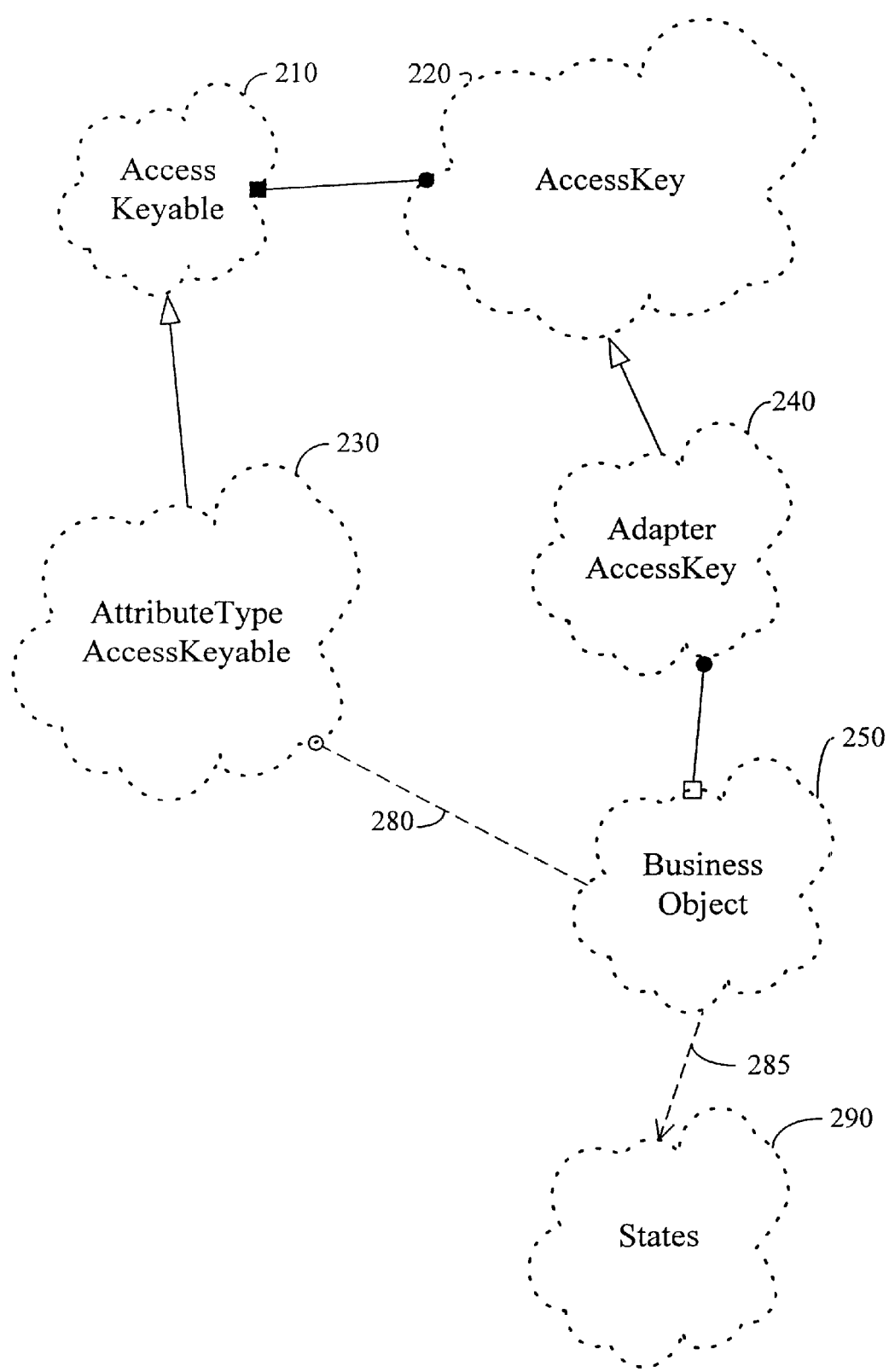
FIG. 2 is object class diagram in accordance with a preferred embodiment of the present invention.

Turning now to FIG. 2, an object class diagram 200 is shown. Object class diagram 200 illustrates preferred classes and structures, but those skilled in the art can adapt the concepts of the current invention for other classes and structures. Adapter access key 240 preferably inherits from and is a subclass of access key 220. This is preferable because then adapter access key 240 has at least the public interfaces and private methods of access key 220. Adapter access key 240 holds onto (by reference) a business object 250. Business object 250 has access to one or more states 290 (only one is shown here) from which keyable criteria may be derived through link 285. States 290 may be any object or other data source from which keyable criteria may be determined. Link 285 could be a reference, inheritance relationship, etc. This essentially means that all state criteria comes from the business object through these states. For instance, a dissection (a line in a journal) references a journal (a chronological listing of all the events that are recorded in an accounting system), so the adapter access key can access the keyable criteria "Fiscal Period" by using the dissection to reference the journal, which has "Fiscal Period" as an attribute or state. Similarly, other keyable criteria such as "Date Audited," whether this is a profit or loss account, "Date Opened," etc., can be determined in the same or a similar manner.

When an access key 220 is created, multiple access keyables 210 are also created (only one access keyable is shown in FIG. 2). Each access keyable 210 is related through inheritance to attribute type access keyable 230, which is a specific value keyable such as a fiscal period, date audited, fiscal year, account, etc. These are the criteria that are used to point to and select a value. Access key 220 also holds onto access keyable 210 by value. It should be noted that other relationships are possible. In particular, copending application "ACCESS KEY OBJECTS" lists several possible relationships. The attribute type access keyables are filled with data extracted from business object 250 (and states 290). This occurs through a reference to the business object (line 280) and occurs at access keyable 210's creation. After this point, link 280 is essentially discarded because the keyables are populated.

FIG. 2 also is helpful in illustrating the differences between the current invention and previous updating methods. Previously, access key 220 was created, all keyables 210 were created and the attributes 230 were filled with criteria by extracting the criteria from business object 280, which derived the criteria from states 290. After all keyables had been populated, the access key 220 was now complete and independent from business object 250 (link 280 was not maintained). In the current invention, adapter access key 240 maintains a reference to business object 250. No keyables are populated when the adapter access key is created. Adapter access key 240, through the link with business object 250, is able to dynamically access criteria from the business object 250 and any states 290. Much of the time spent during key creation has been eliminated. Because adapter access key 240 inherits from access key 220, it is able to "stand in" for the access key and take the access key's place. Access key 220, access keyables 210, and attribute type 230 are still created and used when an access key and value are placed into a cached balance set. Even at this point, however, not all access keys need be determined through reference to the business object (as will be explained later). This reduces key creation time. It can be seen, then, that the adapter access key is best used for updates.

Those skilled in the art will realize that the class and object relationships of FIG. 2 may be modified in a number of ways. For instance, both access key class 220 and adapter access key class 240 could inherit from a generic access key interface. In this embodiment, adapter access key 240 would not inherit from access key class 220. The particular inheritance structure used depends on how a programmer chooses to implement the current invention.

Figure 3:
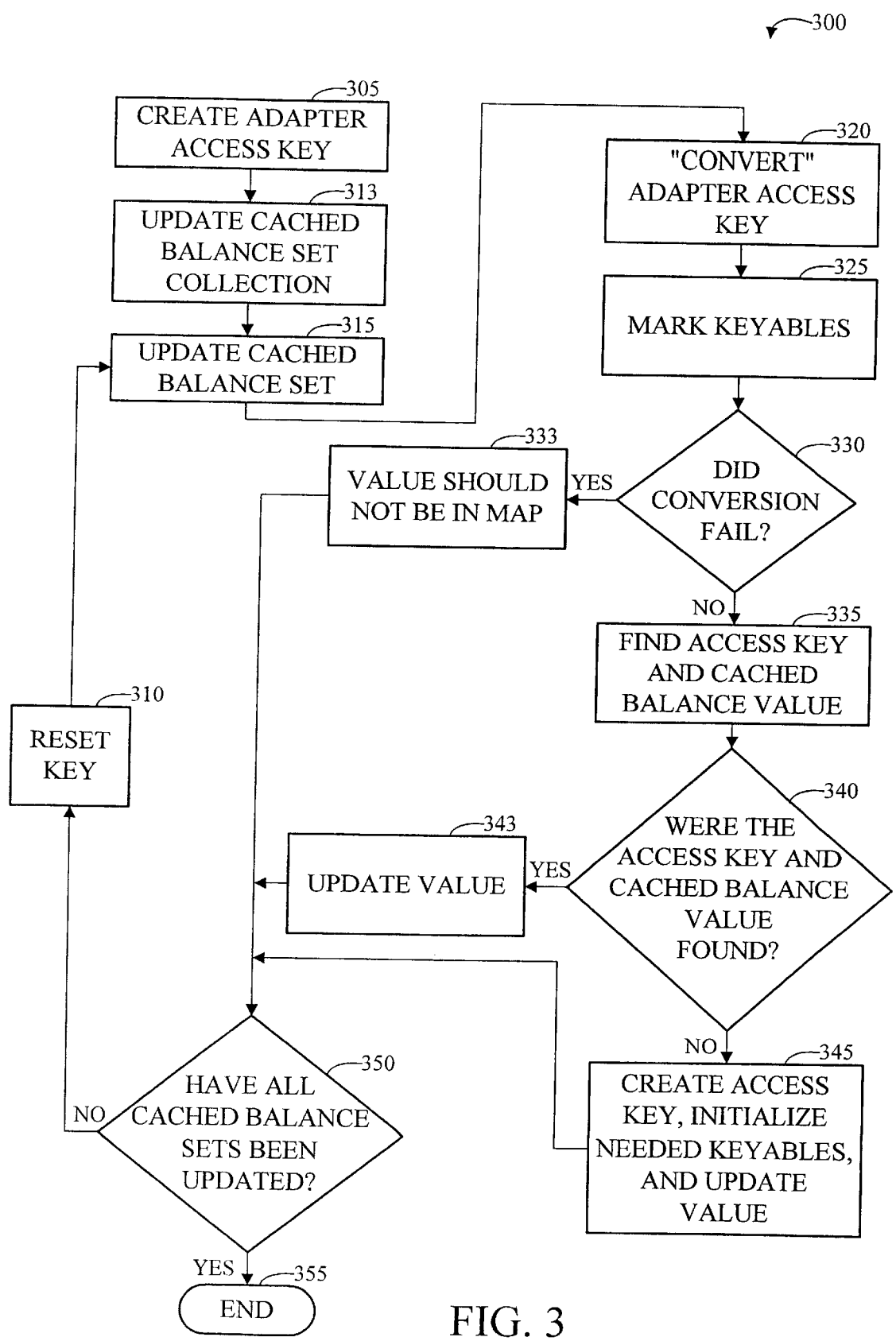
FIG. 3 is a flow diagram of updating a cached balance sets in accordance with a preferred embodiment of the present invention.
Figure 4:
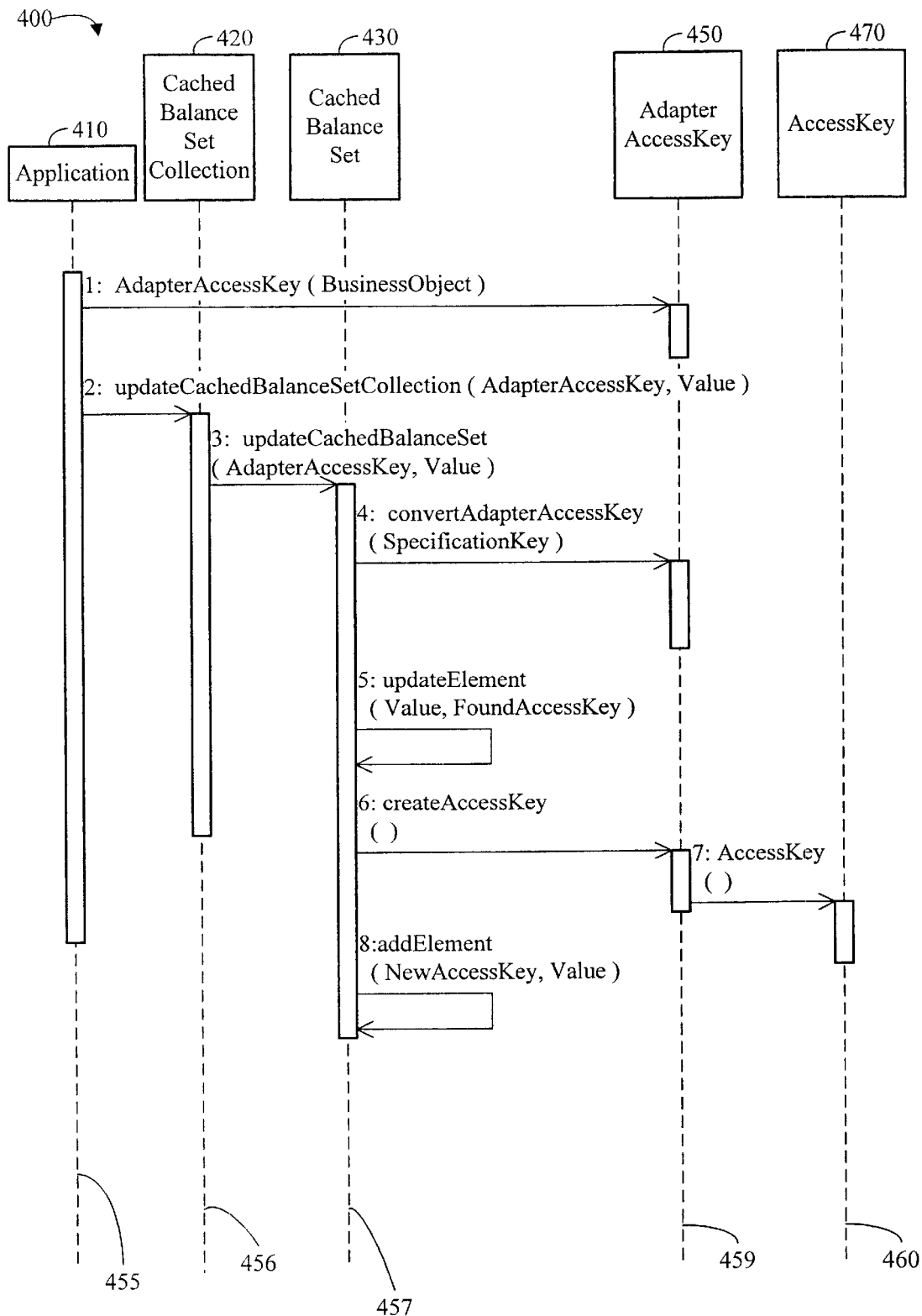
FIG. 4 is an object interaction diagram in accordance with a preferred embodiment of the present invention.
Figure 5:
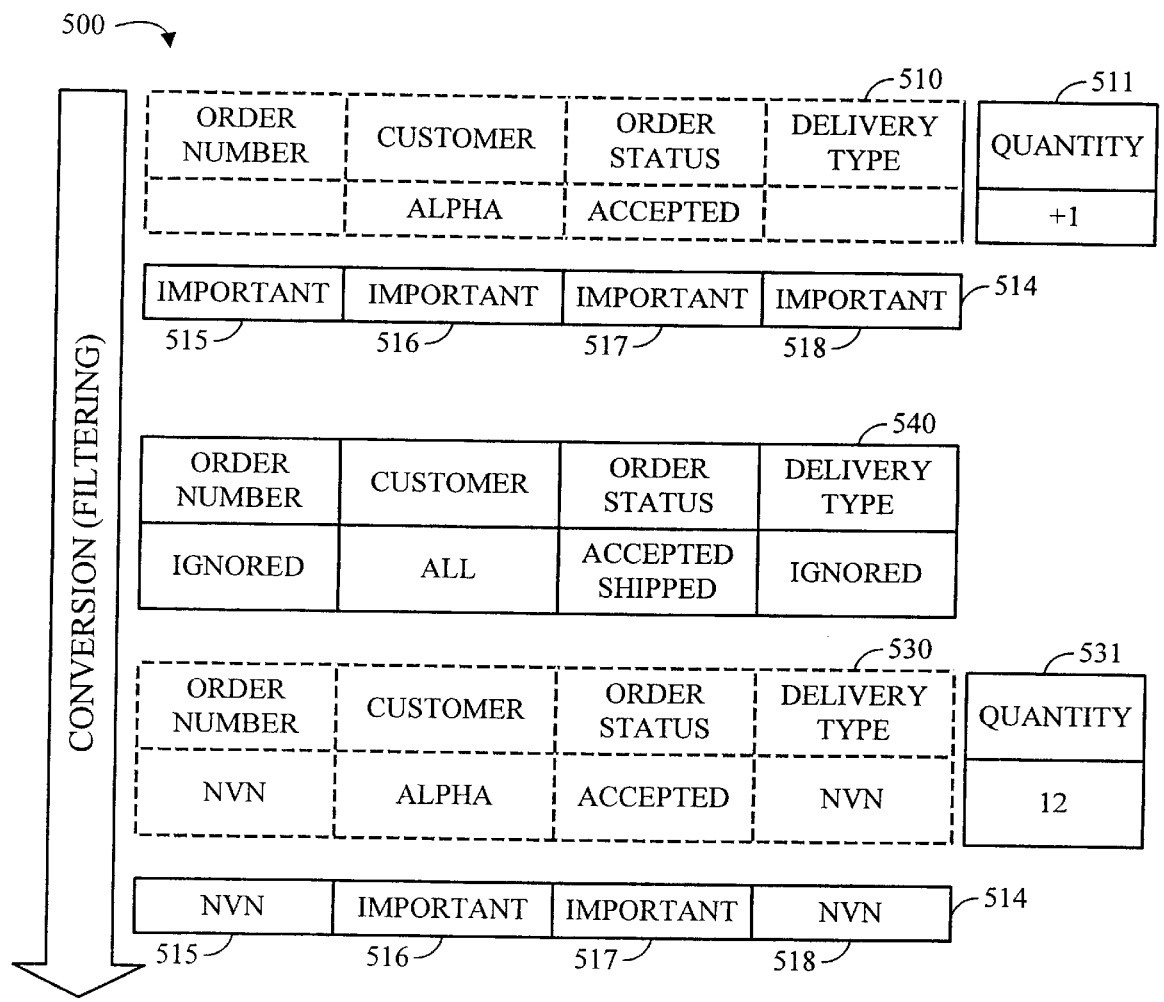
FIGS. 5 and 6 are two illustrations of conversion performed in accordance with a preferred embodiment of the present invention.
Figure 6:
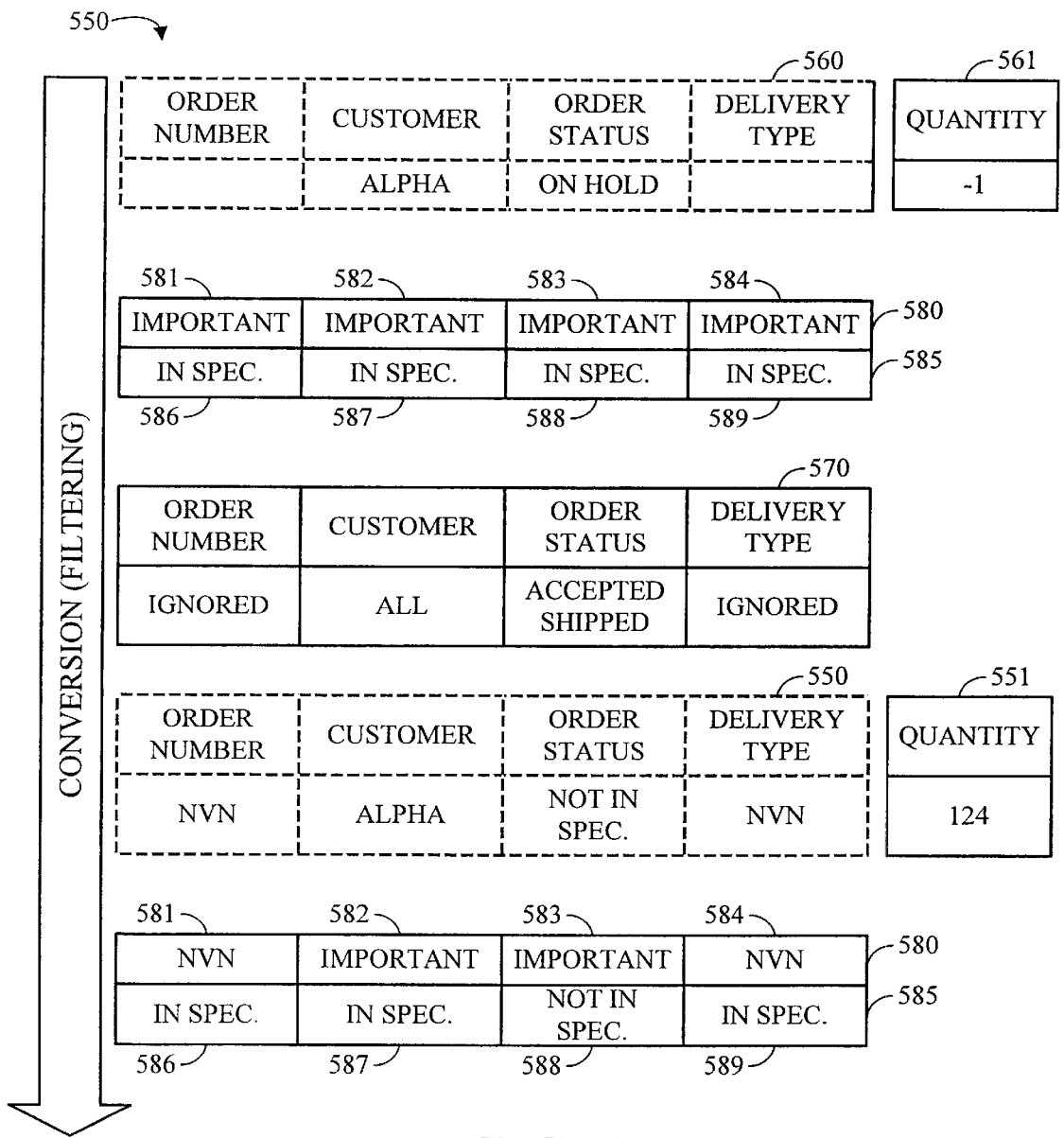

Turning now to FIGS. 3–6, two methods of updating cached balance sets are shown (FIGS. 3 and 4) and two specific examples of conversion are shown (FIGS. 5 and 6). The methods of FIGS. 3 and 4 are used when an application desires to update a value. This value may be in many different forms and in many cached balance sets. For instance, if the number of red cars at a dealership in Germany is being decreased by one car, this decrease in cars affects the amount of cars at the dealership in Germany, the number of cars overseas, the total number of cars owned by the multinational dealership, the total value of all cars owned by the multinational dealership, etc. Thus, the cached balance sets that may contain these values must be informed about the change. The cached balance sets will each compare an adapter access key object to their own specification keys (through the process of conversion) to determine if the key is in their map and how to access the value in their map.

FIG. 3 is a flow diagram of updating these cached balance sets in accordance with the present invention. FIG. 4 is an object interaction diagram 400 that shows the interaction of objects during certain steps of the flow diagram 300 shown in FIG. 3. In FIG. 4, the classes are located at the top of the diagram. Application 410 is an application that interacts with object-oriented software 124 (not shown in FIG. 4) or that is entirely instantiated from a software framework. In general, application 410 provides extra functionality and uses object-oriented software 124 as part of the application's internal core. The other classes illustrated are the cached balance set collection classes 420, the cached balance set classes 430, the adapter access key classes 450, and the access key classes 470. Lines 455, 456, 457, 459, and 460 are indicator lines that indicate which classes have which methods.

FIGS. 5 and 6 show conversion as applied to two different adapter access keys. These figures will be used to illustrate some of the steps involved in method 300 of FIG. 3 and object interaction diagram 400 of FIG. 4.

Method 300 of FIG. 3 starts when the adapter access key is created in step 305. To create the key, the AdapterAccessKey constructor is called as the first method in FIG. 4. The business object that the adapter access key will reference is passed to the constructor. In the method of FIG. 11, the access key would create all keyables and attribute types, then access the business object to get all state criteria to fill and populate the keyables. There would be one criterion per keyable. In the methods of FIGS. 3 and 4, by contrast, no keyables are created at this point. Instead, the adapter access key object references the business object so that the key can dynamically determine the necessary criteria.

In step 313 of FIG. 3, the application has informed a cached balance set collection that it needs to update a value. This step is performed as the second step in FIG. 4, where the updateCachedBalanceSetCollection ( ) method is called on the cached balance set collection class 420. A reference to the adapter access key and the value to be updated are passed to the updateCachedBalanceSetCollection ( ) method. This method then iterates through all of its cached balance sets, informing each cached balance set that it needs to update the value. Only one call to a cached balance set is shown in FIG. 4.

In step 315 of FIG. 3, a cached balance set is informed that it needs to update the value. In FIG. 4, the updateCachedBalanceSet ( ) method (method 3) of the cached balance set class is called by the cached balance set collection object. Again, a reference to the adapter access key and the value are passed to the cached balance set object.

Next, the adapter access key is "converted" in step 320 of FIG. 3. This involves marking keyables for the value update (step 325). The preferred mechanism for this is one or more boolean arrays, which is described in more detail below. Although other mechanisms can achieve a similar function, boolean arrays are ideal because they are easily changed and reset. These two steps are essentially performed very close to the same time, as the conversion process marks keyables that are not used. Using the specification key, the conversion process can immediately determine many keyables that have known values. For instance, those keyables that are "No Value Needed" can be instantly ascertained simply by examining the keyables in the specification key. At the outset, it is preferably assumed that all keyables will be used or will be important. Alternatively, it could be assumed that no keyables will be used. Regardless of these assumptions, examining the specification key then allows those keyables that are not necessary to be marked. If the specification keyable indicates that keyable is important, the adapter access key will dynamically determine the criterion for that keyable. This criterion is then compared to the specification keyable to determine if the keyable is within the set of possible keyables for that specification keyable. Thus, many keyables are marked as unnecessary before any comparisons are performed. Even if comparisons are performed, the number of comparisons will generally be less than in previous manners of updating values.

To convert the adapter access key and mark keys that are not needed, the convertAdapterAccessKey ( ) method (method 4 of FIG. 4) is called on the adapter access key class 450. The cached balance set passed the adapter access key a reference to the specification key. The adapter access key marks the keyables that are not needed with the preferred boolean array, and dynamically ascertains keyable criteria from the business object (not shown in FIG. 4). The business object is not shown because, in general, the state criteria extracted through the business object is available by reference or value, and no method need be called. If it is desired that a method be called on the business object or other objects, then the method call to determine keyable criteria can be made at this juncture. So, the data for each keyable is extracted from the business object when the comparison is made between the criteria for one keyable and the equivalent keyable in the specification key. It should be noted here that, if desired, a Specification Key class could be called, which could then call Adapter Access Key class 450 (with no SpecificationKey reference).

The conversion and marking keyables of adapter access keys are shown in FIGS. 5 and 6. In FIG. 5, conversion 500 occurs on an adapter access key. Adapter access key comprises an array 514 of four boolean variables 515–518, each boolean variable corresponding to a keyable. Each of these boolean variables is assumed to be important at the outset. Thus, they are all initially marked with a value of IMPORTANT. There are example access keys 510 and 530 in the figure that are used for comparison. In the current invention, no keyables are created by the adapter access key. The adapter access key dynamically determines the criterion in each keyable as necessary. Example access keys 510 and 530 are used for illustration purposes only, as they allow the important keyables and their criteria to be easily seen. These access keys represent the important criteria that should be determined by the adapter access key during conversion (and update of the value 511). The update value 511 is also shown, and it indicates that the value 531 pointed to by the example access key 530 must be increased by one.

Specification key 540 is an incomplete specification key. The process of conversion for the current invention is simplified with the addition of the adapter access key. Because order number and delivery type for specification key 540 are ignored, the boolean values 515 and 518 can be changed from IMPORTANT to NVN (No Value Needed). The boolean IMPORTANT indicates that the keyable is important and is within the volume delineated by the specification key, while a boolean of NVN indicates that the keyable is ignored. Thus, instead of comparing the order number keyable in access key 510 with the order number keyable in specification key 540 and marking the resultant converted specification key 530 as NVN, the order number 515 in the adapter access key array 514 is simply marked with a boolean of NVN to indicate that it is NVN. Similarly, the delivery type 518 is immediately marked with a boolean of NVN in adapter access key array 514 to indicate that it is NVN. This examination of the specification key and marking the "ignored" keyables of the specification key with an equivalent boolean value of NVN in the adapter access key array saves comparison time for these keyables.

Because the customer and order status of specification key 540 are not "ignored," these keyables should be determined by the adapter access key. The adapter access key accesses the business object (and potentially other business objects or state objects) to determine the criteria for these keyables. The criteria for these keyables are listed in example access key 510 as customer "alpha" and order status "accepted." Because both of these criteria for the two keyables are within the set of criteria indicated by the specification key for the keyables, both of the boolean variables 516, 517 are left as IMPORTANT. Thus, conversion for the adapter access key that contains boolean array 514 is a process of marking those boolean variables that correspond to ignored keyables in the specification key, and then determining if the other specification keyables are within the criteria in the specification key. Note here that because the customer in the specification keyable is "all," the adapter access key need not access the business object to determine that the customer is "alpha," as any customer will be within the criterion "all." Thus, the adapter access key can simply leave boolean 516 as IMPORTANT. Note also that "marking" as used herein means not only that the boolean facsimile of a keyable is changed, but also that the boolean is not changed. For instance, the adapter access key changed boolean 515 from IMPORTANT to NVN, but did not change boolean 516. Nevertheless, the adapter access key "marked" boolean 516 because the adapter access key determined that "all" customers are IMPORTANT.

If one of the criteria as determined by the adapter access key is not within the criteria specified by the specification key, the conversion on the adapter access key fails (step 330). For instance, in FIG. 5 if the order status was "on hold" as determined by the adapter access key, conversion would fail because the order status of "on hold" is not within the dynamic set of "accepted" and "shipped."

In FIG. 6, another conversion 600 is shown. In this conversion, the specification key 570 is complete. Because complete specification key 570 will delineate a specific volume but will also encompass all possible volume for certain criteria, the criteria (and keyables for those criteria) that are Not in Specification must be marked as such. Thus, not only must important and NVN criteria and keyables be tracked during the conversion process, but Not in Specification keyables and criteria must also be tracked. Similar to FIG. 5, FIG. 6 contains two example access keys 560, 550 that are used solely to illustrate the keyables that will be dynamically determined by the adapter access key. Quantity 561 is also shown in FIG. 6, and this quantity will be used to update quantity 551 that is pointed to by example access key 550. As previously stated, the adapter access key does not create keyables. The adapter access key determines necessary keyables and their criteria when needed by using the business object that the adapter access key holds by reference.

The adapter access key in this example contains two boolean arrays 580, 585. Each boolean variable 581–584 in boolean array 580 indicates if the criterion or keyable is important (IMPORTANT) or is not necessary (NVN). Initially, as in FIG. 5, all of the keyables are assumed to be important and are marked as IMPORTANT. Each boolean variable 586–589 in boolean array 585 indicates if the criterion or keyable is in-specification (IN SPEC.) or out-of-specification (NOT IN SPEC.). In this example, these boolean values are all assumed to be IN SPEC. initially.

As in FIG. 5, a determination of those keyables that are not needed (NVN) may be made simply by examining the specification key 570. If the keyable has a criterion of ignored, then the boolean variable corresponding to that keyable can be marked as NVN. This is shown in FIG. 6, where boolean variables 581 and 584 are marked as NVN. Because the customer and order status keyables of specification key 570 are not set as ignored, the adapter access key must determine the criteria for these keyables. The criteria are a customer of "alpha" and an order status of "on hold." Once the adapter access key has determined the criteria (by using the business object), the converAdapterAccessKey ( ) method of FIG. 4 determines if the individual criterion are within the criteria delineated by the specification key. In this instance, the keyable for customer in specification key 570 has the criterion "all." The customer of "alpha" is within this specific value and is thus within the volume delineated by the specification key. The adapter access key need not determine from the business object that the customer is "alpha," as the specification keyable "all" immediately indicates that any customer meets the criterion of "all." Boolean value 582 is left as IMPORTANT. However, the criterion for order status ("on hold") is not within the dynamic set of criteria ("accepted" or "shipped") specified by the specification 's order status keyable. If specification key 570 were incomplete, the conversion process would fail at this point. Because the specification key is complete, however, the criterion of "on hold" is marked as "NOT IN SPEC." in boolean variable 588 and the conversion finishes. Note that the marking of boolean variable 588 as "NOT IN SPEC." means that the boolean variable 583 is essentially ignored.

Thus, the process for converting an adapter access key in the current invention using a complete specification key is a process of determining which keyables in the specification key are "ignored" and marking the equivalent boolean variables as "No Value Needed." For those specification keyables that are not marked as "ignored," the process then continues by determining if criteria as determined by the adapter access key are within the criteria as determined by the specification keyables. If the criteria are within the specification keyable criteria, then the corresponding boolean variables are marked as being important. If the criteria are not within the keyable criteria, appropriate boolean variables are marked as "not in specification."

Some important notes must be discussed here. In the method of FIG. 11, the access key would be copied and then a comparison and conversion of all keyables would be made. Copying the keyables can be time consuming. In addition, the comparison between the access key and the specification key is very time intensive if only a few access keyables are important, as each keyable is compared between the access and specification keys regardless of whether the keyable is important. In the methods of FIGS. 3 and 4 (as illustrated by FIGS. 5 and 6), the important keyables are already known or easily determined. The adapter access key is able to dynamically determine these keyables from the business object, which has links to state data. Fewer keyables will be compared, and it should be relatively easy to determine if the adapter access key is in the volume specified by the specification key. In the examples of FIGS. 5 and 6, less than half of the keyable criteria had to be determined and compared versus specification keyables.

The one or two boolean arrays may be replaced by other mechanisms, such as arrays of integers, linked lists, doubly linked lists, arrays of objects, etc. The previously discussed boolean arrays are really facsimiles of an adapter access key's keyables. These facsimiles are used to mark which keyables and criteria are not important or are not in specifications. Boolean arrays are the preferred facsimiles because of their simplicity and ease of use. Although it is assumed that all keyable criteria are important and in-specification, the opposite could also be assumed (i.e., that the criteria are not important and not-in-specification). Furthermore, even though the adapter access key is described as "comprising" or "containing" the preferred boolean arrays, the adapter access key could simply manipulate the boolean arrays and never create, initialize, or own the arrays. Preferably, the adapter access key will create, initialize, and own the arrays. However, the adapter access key could simply use the arrays. As a final note, although the values discussed in reference to the present invention are discussed as numbers, the values will generally be objects that contain variables and methods for initializing and changing the variables.

After conversion, if conversion has failed (step 330 of FIG. 3=YES), the value should not be in the map (step 333) and a determination is made to see if all of the cached balance sets have been updated (step 350). If they all have been updated (step 350=YES), then the method of FIG. 3 ends. If they have not all been updated, the adapter access key is reset in step 310 of FIG. 3. If using the boolean array, the elements of the boolean array are merely reset (changed to all ones or all zeros) at this juncture. This is a benefit of using a boolean array, as resetting it is not complex.

If the adapter access key converts (step 330 of FIG. 3=NO), then an effort is made to find the value in the cached balance set (step 335 of FIG. 3). It should be noted here that the cached balance value is found by determining both if there is an equivalent access key in the map and if the value referenced by that key exists. Generally, if there is an access key, there should be a value in the map. So the primary mechanism of finding the cached balance set is by matching an adapter access key in the map (cached balance set) to the criteria specified by the adapter access key. The boolean array or arrays are used to determine the criteria that needs to be determined by the adapter access key. Then, the adapter access key determines the needed criteria so that the updateCachedBalanceSet ( ) method of FIG. 4 can compare the criteria versus the adapter access keys in the map. Once a match is found, the cached balance value is also found.

For instance, in FIG. 5, boolean array 514 is consulted by the updateCachedBalanceSet ( ) method to determine that the important criteria are the customer and order status criteria. As the convert method compares access keys to the important criteria, each criterion is again determined by the adapter access key object and compared to the keyable that corresponds to that criterion. In FIG. 5, one criterion that is determined by the adapter access key object by reference to the business object is the customer criterion of "alpha." This criterion is compared to the criterion of the customer keyable for access keys in the map. Similarly, the order status criterion of "accepted" (as determined by the adapter access key object through the business object) is compared to the criterion of the order status keyable for access keys in the map. When a match for these two criteria is found, the access key and thus the cached balance value have been found.

Similarly, in FIG. 6, the important criteria are determined by the adapter access key object through the business object's reference, and these criteria are compared to the access keys in the cached balance set's map. This is a simple comparison, as the only important criterion that is within specification is the customer criterion of "alpha," which corresponds to the customer keyable of access keys in the map. If a matching access key is located, the corresponding cached balance value is found.

If the value is found (step 340 of FIG. 3=YES), then the value is updated (step 343 of FIG. 3). In FIG. 4, the fifth method (updateElement ( )) is called to update the value. This method is passed the new value and the newly found adapter access key. Method 5 of FIG. 4 corresponds to step 343 of FIG. 3, and methods 6, 7, and 8 of FIG. 4 correspond to step 345 of FIG. 3. Steps 343 and 345 of FIG. 3 are mutually exclusive. In step 343, the value (and an access key pointing to the value) is in the map of the cached balance set and only needs to be updated. Meanwhile, in step 345 the value is not in the map and the access key that points to the value and the value need to be added to the map. Both steps have equivalent method calls in FIG. 4 only to illustrate how the steps are performed.

When the appropriate access key is found in the map of the cached balance set, the value is updated. In FIG. 5, quantity 511 (a positive one) is added to quantity 531 (a value of 12) to make quantity 531 be a value of 13 (not shown in FIG. 5). In FIG. 6, quantity 561 (a negative one) is added to quantity 551 (a value of 124) to make quantity 551 be a value of 123 (not shown in FIG. 6).

If the cached balance value is not found (step 340 of FIG. 3=NO), then it and the access key that points to it should be added to the cached balance set (step 345 of FIG. 3). To do this in FIG. 4, a createAccessKey method (method 6) is called on the adapter access key. The adapter access key already has a reference to a business object, and has (or has access to) a boolean array that marks the keyables as important. To create an access key, the adapter access key class 450 calls the AccessKey constructor method (method 7). The access key constructor returns a reference to an essentially empty access key. In FIG. 11, the converted access key would already exist at this point, and thus could be added to the map determined by the cached balance set. Here, in FIGS. 3 and 4, the adapter access key is an object that holds onto a business object, and has no keyables populated. Thus, an access key must be created in the map. However, the process of creating an access key is faster because only the important keyables are created (as per the boolean array), the rest of the keyables are simply "filled in" or set. The adapter access key determines the necessary criteria from the business object, creates all keyables, initializes those important keyables with the criteria from the business object, and then initializes the rest of the keyables with the proper criteria.

For instance, in FIG. 5, an access key like example access key 530 must be created. Using boolean array 514, the adapter access key object, after creating a new access key, knows to set the order number and delivery type keyables in the new access key with the criterion NVN. The adapter access key also knows that the customer and order status must be determined from the business object. The adapter access key determines these criteria and appropriately fills in or sets the customer and order status keyables in the new access key. A new access key like access key 530 should be entered into the map by the cached balance set. Quantity 531 is also created in the map and initialized by the cached balance set object. Quantity 511 is usually added to some starting value to create quantity value 531. Alternatively, quantity 511 could be the starting quantity used to make the new quantity 531 in the map. In either case, the "12" for quantity 531 in FIG. 5 is only an example.

In FIG. 6, an access key like example access key 550 must be created. Using boolean arrays 580 and 585, the adapter access key object, after creating a new access key, knows to set the order number and delivery type keyables in the new access key with the criterion NVN and to set the order status as "Not in Specification." The adapter access key also knows that the customer must be determined from the business object. The adapter access key determines this criterion and appropriately fills in or sets the customer keyable in the new access key. A new access key like access key 550 should be entered into the map by the cached balance set. Quantity 551 is also created in the map and initialized by the cached balance set object. Quantity 561 is usually added to some starting value to create quantity value 551. Alternatively, quantity 561 could be the starting quantity used to make the new quantity 551 in the map.

Note that in FIGS. 5 and 6 only a few keyables are being determined. Only those important keyables are determined from the business object and the rest of the keyables are simply set using the boolean array(s).

After the new access key is populated, the access key and the value are added to the map defined by the cached balance set (as described above in reference to FIGS. 5 and 6). Adding elements is performed by calling the addElement subroutine (method 8 of FIG. 4) with a reference to the new access key and the value. This adds this element to the map. Now that this value has been updated in this cached balance set, the next cached balance set is updated, and so on, until all cached balance sets in the cached balance set collection have been updated.

As shown in the previous examples, the preferred embodiments of the present invention provide a method and apparatus for dynamically loading criteria from another object to reduce the amount of total criteria necessary to update a referenced value. When updating a value that is pointed to by an object (an access key) that depends on other objects (access keyables) for criteria necessary to point to the value, an adapter object (an adapter access key) is used instead of the access key. Instead of creating and populating all of the access keyables, the adapter access key holds onto the source of the data (a business object) needed to fill the access keyables. The adapter access key extracts criteria from the business object only for those keyables that are used to update the value. Preferably, the keyables are marked in such a way (such as with a boolean array) that the adapter access key can be easily reset and used for multiple updates. This eliminates copying of the original key and minimizes comparison time.

By using the adapter access key to update cached balance set collections, no copying of the adapter access key is needed for each update of a cached balance set. The adapter access key is used as is for each update, and a simple reset of the key is all that is necessary for reuse. In addition, if access keys are made (if the value updated is not found in the cached balance set), the time involved with extracting criteria to fill the keyables is reduced because keyables that are not necessary (marked as No Value Needed or Not in Specification) do not have to have their data copied from the business object. In this manner, the only the keyables that should be filled actually are filled, and the rest are simply filled with the appropriate stateless keyable (such as No Value Needed or Not in Specification).

While the present invention has been particularly shown and described with reference to preferred embodiments thereof, it will be understood by those skilled in the art that various changes in form and details may be made therein without departing from the spirit and scope of the invention.

What is claimed is:

1. An apparatus comprising:
   at least one processor;
   a memory coupled to the at least one processor; and
   an adapter access key residing in the memory, the adapter access key attempting to update at least one value by accessing at least one object to dynamically determine at least one criterion of a set of data access object criteria needed to locate at least one data access object that is used to reference and locate the at least one value for updating, the adapter access key updating the at least one value if the at least one criterion is in the set of data access object criteria and not updating the at least one value if the at least one criterion is not in the set of data access object criteria.

2. The apparatus of claim 1 wherein the at least one value may be in a database and the adapter access key attempts to update the value in the database.

3. The apparatus of claim 1 wherein there is a map located in the memory, the map capable of containing the at least one data access object and the at least one value.

4. The apparatus of claim 3 wherein the at least one criterion is in the set of data access object criteria such that the at least one data access object should be in the map, wherein the adapter access key cannot locate the at least one data access object in the map, wherein the adapter access key adds the at least one data access object and the at least one value to the map, and wherein the adapter access key updates the at least one value.

5. The apparatus of claim 3 wherein potential contents of the map are determined by a specification key having a set of specification criteria, each specification criterion corresponding to a data access object criterion.

6. The apparatus of claim 5 wherein the adapter access key uses the specification key to determine if the at least one data access object could be in the map.

7. The apparatus of claim 6 wherein the adapter access key marks a facsimile of the set of data access object criteria as it determines if the data access object could be in the map, wherein the facsimile comprises a plurality of elements, each element corresponding to one data access object criterion, wherein the adapter access key uses the specification criteria to mark as unimportant elements of the facsimile that correspond to unimportant specification criteria, and wherein the adapter access key marks as important at least one element that corresponds to the at least one criterion of the data access object criteria if the at least one criterion is within the set of specification key criteria.

8. The apparatus of claim 7 wherein the facsimile comprises at least one boolean array, each boolean array comprising one boolean per data access object criterion.

9. The apparatus of claim 7 wherein the specification key is complete, and wherein the adapter access key marks as "Not in Specification" at least one element that corresponds to the at least one criterion of the data access object criteria if the at least one criterion is not within the set of specification key criteria.

10. A method for attempting to update and updating at least one value in a computer system, the computer system comprising a memory coupled to at least one processor and an adapter access key residing in the memory, the method comprising:
    the adapter access key accessing at least one object to dynamically determine at least one criterion of a set of data access object criteria needed to locate at least one data access object that is used to reference and locate the at least one value for updating;
    determining if the at least one criterion is within the set of data access object criteria;
    attempting to locate the at least one data access object if the at least one criterion is within the set of data access object criteria; and
    updating the at least one value if the at least one data access object is located in the map.

11. The method of claim 10 wherein the at least one value is not updated because the at least one criterion is not in the set of data access object criteria.

12. The method of claim 10 wherein the at least one value may in a database and the step of updating the at least one value if the at least one data access object is located in the map comprises the step of updating the value in the database if the at least one criterion is within the set of data access object criteria.

13. The method of claim 10 wherein there is a map located in the memory, the map capable of containing the at least one data access object and the at least one value.

14. The method of claim 13 wherein the at least one criterion is in the set of data access object criteria such that the at least one data access object should be in the map, wherein the adapter access key does not locate the at least one data access object in the map, and where in the method further comprises the step of the adapter access key adding the at least one data access object and the at least one value to the map.

15. The method of claim 13 wherein potential contents of the map are determined by a specification key having a set of specification criteria, each specification criterion corresponding to a data access object criterion, and wherein the step of determining if the at least one criterion is within the set of data access object criteria comprises the step of determining if the at least one criterion is within the set of specification criteria.

16. The method of claim 15 wherein the adapter access key comprises a facsimile of the set of data access object criteria, wherein the facsimile comprises a plurality of elements, each element corresponding to one data access object criterion, wherein the method further comprises the steps of the adapter access key using the specification criteria to mark as unimportant elements of the facsimile that correspond to unimportant specification criteria, and the step of the adapter access key marking as important at least one element that corresponds to the at least one criterion of the data access object criteria if the at least one criterion is within the set of specification key criteria.

17. The method of claim 16 wherein the facsimile comprises at least one boolean array, each boolean array comprising one boolean per data access object criterion.

18. The method of claim 16 wherein the specification key is complete, and wherein the method further comprises the step of adapter access key marking as "Not in Specification" at least one element that corresponds to the at least one criterion of the data access object criteria if the at least one criterion is not within the set of specification key criteria.

19. A program product comprising:

an adapter access key, the adapter access key attempting to update at least one value by accessing at least one object to dynamically determine at least one criterion of a set of data access object criteria needed to locate at least one data access object that is used to reference and locate the at least one value for updating, the adapter access key updating the at least one value if the at least one criterion is in the set of data access object criteria and not updating the at least one value if the at least one criterion is not in the set of data access object criteria; and signal bearing media bearing the adapter access key.

20. The program product of claim 19 wherein the signal bearing media comprises transmission media.

21. The program product of claim 19 wherein the signal bearing media comprises recordable media.

22. The program product of claim 19 wherein the at least one value may be in a database and the adapter access key attempts to update the value in the database.

23. The program product of claim 19 wherein there is a map capable of containing the at least one data access object and the at least one value.

24. The program product of claim 23 wherein the at least one criterion is in the set of data access object criteria such that the at least one data access object should be in the map, wherein the adapter access key cannot locate the at least one data access object in the map, and wherein the adapter access key adds the at least one data access object and the at least one value to the map.

25. The program product of claim 23 wherein potential contents of the map are determined by a specification key having a set of specification criteria, each specification criterion corresponding to a data access object criterion.

26. The program product of claim 25 wherein the adapter access key uses the specification key to determine if the at least one data access object could be in the map.

27. The program product of claim 26 wherein the adapter access key marks a facsimile of the set of data access object criteria as it determines if the data access object could be in the map, wherein the facsimile comprises a plurality of elements, each element corresponding to one data access object criterion, wherein the adapter access key uses the specification criteria to mark as unimportant elements of the facsimile that correspond to unimportant specification criteria, and wherein the adapter access key marks as important at least one element that corresponds to the at least one criterion of the data access object criteria if the at least one criterion is within the set of specification key criteria.

28. The program product of claim 27 wherein the facsimile comprises at least one boolean array, each boolean array comprising one boolean per data access object criterion.

29. The program product of claim 27 wherein the specification key is complete, and wherein the adapter access key marks as "Not in Specification" at least one element that corresponds to the at least one criterion of the data access object criteria if the at least one criterion is not within the set of specification key criteria.

* * * * *